United States Patent
Gage et al.

(10) Patent No.: US 10,237,695 B2
(45) Date of Patent: *Mar. 19, 2019

(54) PROXIMITY AND INTEREST DETERMINATION BY A WIRELESS DEVICE

(71) Applicant: BlackBerry Limited, Waterloo, Ontario (CA)

(72) Inventors: William Anthony Gage, Stittsville (CA); Biswaroop Mukherjee, Stittsville (CA); Robert Novak, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,679

(22) Filed: May 25, 2018

(65) Prior Publication Data

US 2018/0279080 A1    Sep. 27, 2018

Related U.S. Application Data

(63) Continuation of application No. 13/750,331, filed on Jan. 25, 2013, now Pat. No. 9,986,380.

(51) Int. Cl.
| | |
|---|---|
| *H04B 7/00* | (2006.01) |
| *H04W 4/02* | (2018.01) |
| *H04W 76/14* | (2018.01) |
| *H04W 4/21* | (2018.01) |
| *H04W 8/00* | (2009.01) |

(52) U.S. Cl.
CPC ............. *H04W 4/023* (2013.01); *H04W 4/21* (2018.02); *H04W 8/005* (2013.01); *H04W 76/14* (2018.02)

(58) Field of Classification Search
CPC ........... H04W 76/023; H04W 72/0413; H04W 72/042; H04W 72/0406; H04W 8/005; H04W 4/005; H04W 72/044; H04W 76/025
USPC ........................................................ 455/41.2
See application file for complete search history.

(56) References Cited

U.S. PATENT DOCUMENTS

| | | | |
|---|---|---|---|
| 2005/0113107 A1 | 5/2005 | Meunier | |
| 2007/0124721 A1 | 5/2007 | Cowing | |
| 2011/0258313 A1 | 10/2011 | Mallik et al. | |
| 2011/0275382 A1 | 11/2011 | Hakola | |

(Continued)

FOREIGN PATENT DOCUMENTS

| | | |
|---|---|---|
| EP | 2312871 A1 | 4/2011 |
| WO | 2012001624 | 1/2012 |

OTHER PUBLICATIONS

3GPP TR 22.803 V0.2.0, Technical Report, 3rd Generation Partnership Project; Technical Specification Group SA; Feasibility Study for Proximity Services (ProSe) (Release 12), (Feb. 2012) (17 pages).

(Continued)

*Primary Examiner* — Ajibola A Akinyemi
(74) *Attorney, Agent, or Firm* — Trop, Pruner & Hu, P.C.

(57) ABSTRACT

A first wireless device determines whether the first wireless device is in a specified proximity to a second wireless device based on a signal wirelessly transmitted by the second wireless device. Based on information transmitted by the second wireless device, it is determined whether the first wireless device shares a common interest with the second wireless device.

22 Claims, 11 Drawing Sheets

(56) References Cited

U.S. PATENT DOCUMENTS

| | | | |
|---|---|---|---|
| 2012/0253936 A1 | 10/2012 | Swenson | |
| 2013/0005377 A1 | 1/2013 | Wang et al. | |
| 2013/0217336 A1* | 8/2013 | McCormack | H04W 8/085 455/41.2 |
| 2014/0010172 A1 | 1/2014 | Wei | |
| 2014/0012917 A1* | 1/2014 | Baca | G06Q 50/30 709/204 |
| 2014/0094162 A1 | 4/2014 | Heo | |
| 2015/0071212 A1 | 3/2015 | Kim | |
| 2015/0289282 A1 | 10/2015 | Phuyal | |

OTHER PUBLICATIONS

3GPP TR 22.803 V12.0.0, Technical Report, 3rd Generation Partnership Project; Technical Specification Group Services and System Aspects; Feasibility study for Proximity Services (ProSe) (Release 12), (Dec. 2012) (40 pages).

3GPP TS 36.211 V11.1.0, Technical Specification, 3rd Generation Partnership Project; Technical Specification Group Radio Access Network; Evolved Universal Terrestrial Radio Access (E-UTRA); Physical Channels and Modulation (Release 11), (Dec. 2012) (108 pages).

3GPP TS 36.300 V11.4.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Dec. 2012) (208 pages).

3GPP TS 36321 V11.1.0, Technical Specification, 3rd Generation Partnership Project; Technical Specification Group Radio Access Network; Evolved Universal Terrestrial Radio Access (E-UTRA); Medium Access Control (MAC) protocol specification (Release 11) (Dec. 2012) (57 pages).

3GPP TS 36331 V11.2.0 (Dec. 2012), Technical Specification, 3rd Generation Partnership Project; Technical Specification Group Radio Access Network; Evolved Universal Terrestrial Radio Access (E-UTRA); Radio Resource Control (RRC); Protocol specification (Release 11) (340 pages).

Doppler et al., Device-to-Device Communication as an Underlay to LTE-Advanced Networks, IEEE Communications Magazine, Dec. 2009 (8 pages).

Mustafa Ergen, Tutorial, IEEE 802.11 Wireless Local Area Network (WLAN) Standard. IEEE 302.11 MAC Layer in detail and it briefly mentions IEEE 802.11a, IEEE 802.11b physical layer standard and IEEE 802.11e MAC layer standard, Jun. 2002 (93 pages).

Maury Wright, Electronic Products, TechZone, Wireless Solutions, Wi-Fi Direct adds Peer-to-Peer Capabilities to Ubiquitous Wireless Network Technology dated on or before Jan. 29, 2013 (3 pages).

The International Bureau of WIPO, International Preliminary Report on Patentability for PCT/CA2014/050048 dated Jul. 28, 2015 (5 pages).

European Patent Office, Extended European Search Report for EP14743469.0 dated Jul. 21, 2016 (8 pages).

Canadian Intellectual Property Office, Written Opinion and Search Report for PCT/CA2014/050048 dated Apr. 30, 2014 (8 pages).

European Patent Office, Extended European Search Report for Appl. No. 18199185.2 dated Dec. 7, 2018 (9 pages).

* cited by examiner

PROXIMITY AND INTEREST DETERMINATION BY A WIRELESS DEVICE

CROSS REFERENCE TO RELATED APPLICATIONS

This is a continuation of U.S. application Ser. No. 13/750,331, filed Jan. 25, 2013, U.S. Pat. No. 9,986,380, which is hereby incorporated by reference in their entirety.

BACKGROUND

Wireless devices can communicate with each other through a wireless access network. The wireless devices can establish wireless links with the wireless access network, after which each wireless device can communicate data with the wireless access network. Communication of data between wireless devices can be accomplished by a source wireless device sending the data to the wireless access network, which then forwards the data to the destination wireless device.

A different type of wireless communication between wireless devices involves device-to-device (D2D) communication. In a D2D communication, wireless devices that are in sufficiently close proximity to each other can send data directly to each other, without first sending the data to the wireless access network. The establishment of a D2D link between wireless devices can still be controlled by the wireless access network.

BRIEF DESCRIPTION OF THE DRAWINGS

Some embodiments are described with respect to the following figures.

DETAILED DESCRIPTION

Figure 1:
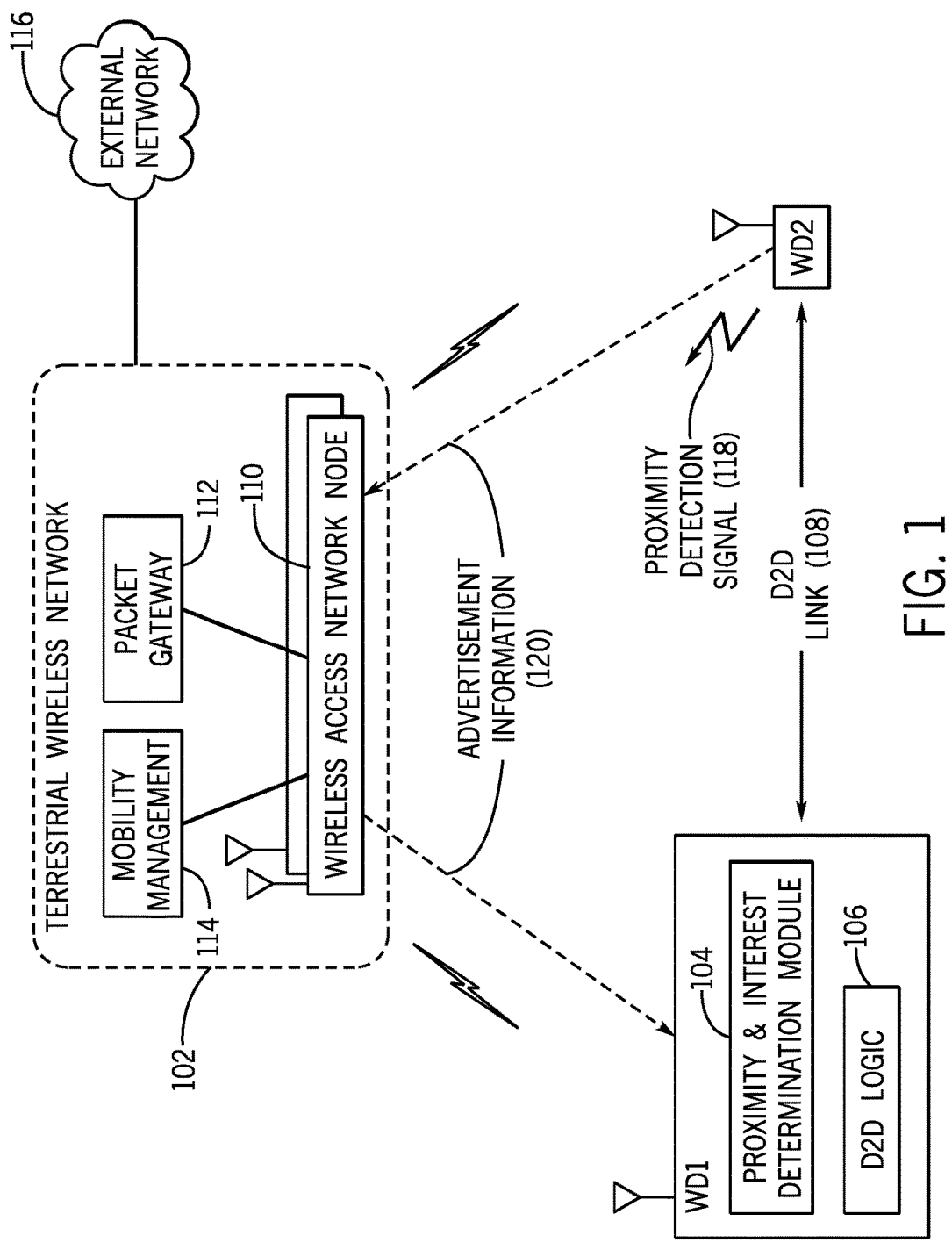
FIG. 1 is a block diagram of an example network arrangement, according to some implementations.

A device-to-device (D2D) link wirelessly connects wireless devices to each other so that the wireless devices can communicate data over the D2D link. D2D links generally provide relatively short range wireless connections between wireless devices in relative close proximity to each other. In some cases, a D2D link may be able to support a higher communications bandwidth than a bandwidth associated with wireless communications in which data is passed through one or multiple wireless access network nodes. A D2D link may experience a signal-to-interference-plus-noise ratio (SINR) that is superior to the SINR of a wireless link between a wireless device and a wireless access network node. Wireless links established with wireless access network nodes may be bandwidth-constrained due to a combination of relatively poor signal quality and contention for radio resources by a relatively large number of wireless devices. Additionally, a D2D link may use a lower transmission power than a wireless link established between a wireless device and a wireless access network node, thus reducing inter-device interference and allowing for spatial reuse of wireless resources.

In the ensuing discussion, reference is made to D2D links and other wireless links that are radio links (which is a wireless link that uses signals in a radio frequency spectrum). In other implementations, D2D links and other wireless links can be established in other frequency spectrums.

In some implementations, D2D links may utilize the same radio access technology as wireless links established between wireless devices and wireless access network nodes. For example, one such radio access technology is the Long Term Evolution (LTE) technology, as defined by standards provided by the Third Generation Partnership Project (3GPP). The LTE standards are also referred to as the Evolved Universal Terrestrial Radio Access (E-UTRA) standards. When using the same radio access technology, a wireless device may use one physical radio interface for both D2D links and wireless links established with the wireless access network. Alternatively, a wireless device may have separate physical radio interfaces for the different links.

In other implementations, D2D links can use a radio access technology that is different from the radio access technology of wireless links between wireless devices and wireless access network nodes.

The establishment of D2D links between wireless devices may be initiated by a network, and can be based on a determination of proximity of wireless devices. Establishing D2D links is associated with some amount of overhead at the network (as well as at the wireless devices). Thus, it may not be desirable to establish D2D links between wireless devices just because the wireless devices happen to be close to each other. Wireless devices that are in close proximity to each other may not have much data to send to each other. Thus, establishing D2D links for such wireless devices that do not frequently communicate may not be efficient.

In accordance with some implementations, the establishment of a D2D link between wireless devices is based on multiple factors, which can include at least the following: (1) proximity of wireless devices to each, and (2) whether the wireless devices share a common interest. The sharing of a common interest increases the likelihood that the wireless devices would communicate more data with each other, thereby justifying the overhead associated with establishing a D2D link between the wireless devices.

FIG. 1 is a block diagram of an example network arrangement that includes wireless devices WD1 and WD2, which are both capable of wirelessly communicating with a terrestrial wireless network 102. Examples of wireless devices include mobile telephones, smartphones, personal digital assistants (PDAs), notebook computers, desktop computers, game appliances, server computers, storage systems, or any other devices that are capable of performing wireless communications. The terrestrial wireless network 102 can refer to any network that can manage the wireless communications with wireless devices within a coverage area or coverage areas of the terrestrial wireless network 102. Although just two wireless devices are depicted in FIG. 1, it is noted that there can be more than two wireless devices.

In accordance with some implementations, a D2D link 108 can be established between the wireless devices WD1 and WD2 based on a determination of multiple factors, including proximity of the wireless devices WD1 and WD2 and whether there exists common interest between the wireless devices. An interest of a wireless device can be expressed by an application running on the wireless device, a user of the wireless device, or by another source. Although FIG. 1 depicts a D2D link 108 established between two wireless devices, it is noted that multiple D2D links can be established between respective pairs of wireless devices.

In the example of FIG. 1, the wireless device WD1 includes a proximity and interest determination module 104, which is able to determine the proximity of another wireless device (e.g. WD2) and whether or not the wireless device WD1 shares a common interest with the wireless device WD2. The wireless device WD1 also includes D2D logic 106 which can cooperate with the terrestrial wireless network 102 for establishing the D2D link 108 between the wireless devices WD1 and WD2. Although not shown, the wireless device WD2 can similarly include a proximity and interest determination module and D2D logic.

The terrestrial wireless network 102 includes wireless access network nodes 110, which are able to wirelessly communicate with the wireless devices WD1 and WD2. In an LTE network, a wireless access network node is an enhanced node B (eNB), which provides base station and base station controller functionalities. Although the ensuing discussion refers to LTE communications, it is noted that techniques or mechanisms according to some implementations can also be applied with other wireless access technologies. A wireless access network node can alternatively refer to any of the following: a base station, a node B, a wireless local area network/metropolitan area network access point, radio network controller, or any other wireless access controller.

The terrestrial wireless network 102 also includes a packet gateway 112 and a mobility management module 114. The mobility management module 114 is a control node for performing various control tasks associated with the terrestrial wireless network 102, such as any one or some combination of the following: idle node wireless device tracking and paging, bearer activation and deactivation, handover of a wireless device between wireless access network nodes, authentication of a user, generation and allocation of a temporary identity to a wireless device, and so forth. The packet gateway 112 can route and forward bearer data packets (e.g. data packets containing voice data or application data) of a wireless device served by the packet gateway. Although just one mobility management module 114 and packet gateway 112 are depicted in FIG. 1, it is noted that there can be multiple instances of the mobility management module and the packet gateway in the terrestrial wireless network 102. In an LTE network, the mobility management module 114 can be referred to as a mobility management entity (MME), while the packet gateway 112 can include a serving gateway (SGW) and a packet data gateway (PGW).

The terrestrial wireless network 102 can be connected to an external network 116, such as the Internet, a wide area network, or a local area network. A wireless device can communicate with a network entity on the external network 116 through the terrestrial wireless network 102.

In the example of FIG. 1, the wireless device WD2 can transmit a proximity detection signal 118, which can be detected by the wireless device WD1 for the purpose of determining proximity between the wireless devices WD1 and WD2. In addition, the wireless device WD2 can send advertisement information 120 that can include various items associated with the wireless device WD2, which are usable by the wireless device WD1 for determining whether or not the wireless device WD1 shares a common interest with a wireless device WD2. Note that reference to sharing a common interest between wireless devices can refer to sharing interests of applications of the wireless devices, or interests of users of the wireless devices, and so forth. An "item" of the advertisement information 120 can include any information associated with a wireless device (or an application or user of the wireless device) that may be useable for ascertaining whether wireless devices share a common interest.

The advertisement information 120 can be sent between the wireless devices WD2 and WD1 through one or more wireless access network nodes 110 (note that the wireless devices WD1 and WD2 may be served by different wireless access network nodes or the same wireless access network node). Alternatively, the advertisement information 120 can be sent directly between the wireless devices WD1 and WD2, without passing through any node of the terrestrial wireless network 102.

Although the wireless access network nodes 110 in FIG. 1 are depicted as being connected to core network nodes such as the packet gateway 112 and the mobility management node 114, in other examples, a wireless access network node can operate in a stand-alone mode with no backhaul connections to a core network. The stand-alone wireless access network node can participate in establishing D2D links between wireless devices within the coverage area of the stand-alone wireless access network node. For example, after a natural disaster or during an emergency, first responder units may wish to communicate amongst members of a team, or between members of different agencies, or with victims of the disaster—in such scenarios, a wireless access network node may have lost communications to a core network, but the wireless access network node may nevertheless operate in stand-alone mode to assist in establishing D2D links to enable wireless devices to communicate with each other.

Various example usage scenarios are provided below. In one example, a server of a retail store can advertise the retail store's offerings to wireless devices that come within range of the retail store. A wireless device of a potential customer can match the advertisement information from the server of the retail store with interests of the customer wireless device to determine whether a D2D link should be established between the server of the retail store and the customer wireless device.

As another example, at a social gathering, a first wireless device can advertise the identity and/or interests of the associated user to other wireless devices that come within the range of the first wireless device. A match in interest is determined, then a D2D link can be established between the first wireless device and another wireless device.

In a tourist area or a museum, points of interest (or more specifically, servers at the points of interest) can announce themselves to wireless devices that come within the range of the points of interest. A customer wireless device can match the announcements with interests of the user of the customer device to determine whether or not a D2D link should be established with the respective server of a point of interest.

When on the road, a wireless device attached to a first vehicle can announce information that the vehicle has collected and stored in the recent travels of the vehicle. Other vehicles that the wireless device encounters can determine whether or not the information of the first vehicle is of interest to the other vehicles, and if so, a D2D link can be established to retrieve the information.

Figure 2:
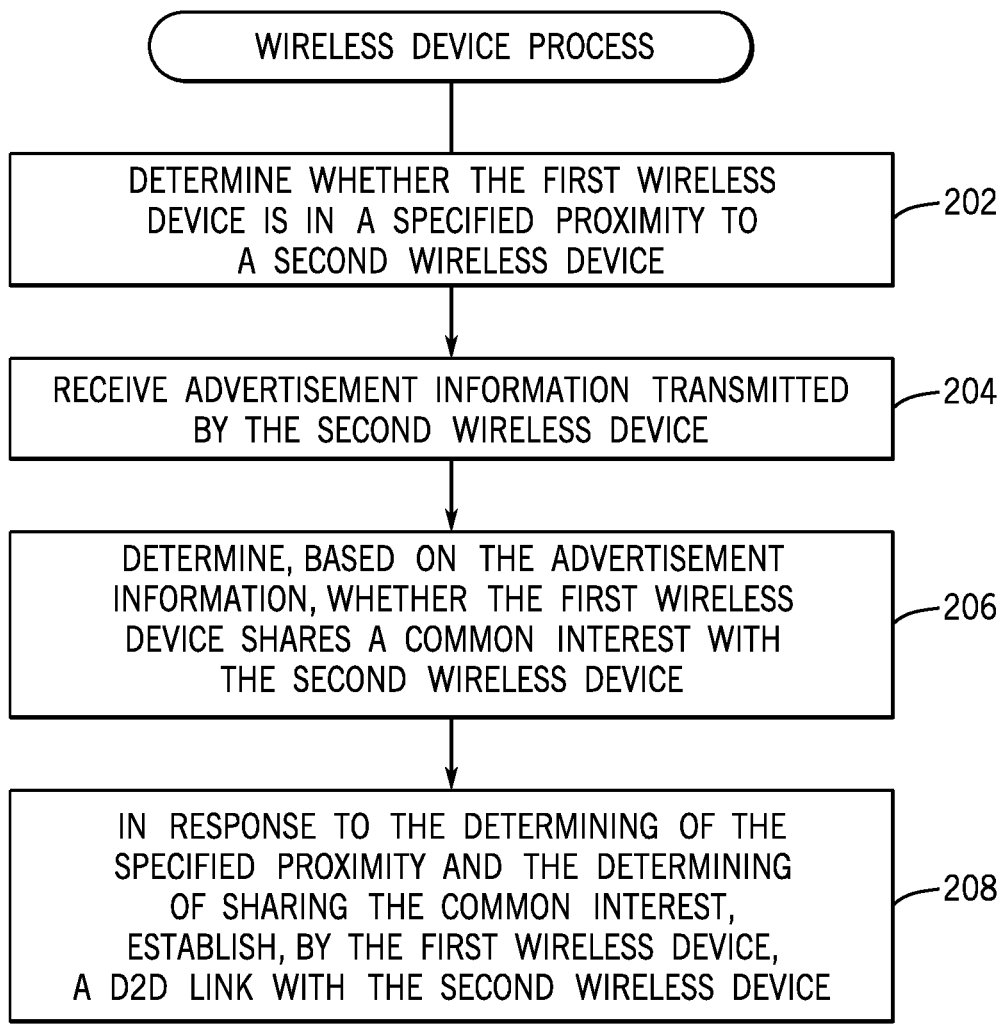
FIG. 2 is a flow diagram of a process of a wireless device, according to some implementations.

FIG. 2 is a flow diagram of a process of a wireless device (e.g. wireless device WD1) according to some implementations. The wireless device WD1 can determine (at 202) whether the wireless device WD1 is in a specified proximity to the wireless device WD2, based on the proximity detection signal 118 wirelessly transmitted by the wireless device WD2. The specified proximity can be indicated if the detected proximity detection signal satisfies a strength threshold or satisfies any other specified criterion.

The wireless device WD1 further receives (at 204) advertisement information 120 transmitted by the wireless device WD2, where the advertisement information 120 can be received either directly from the wireless device WD2 or indirectly through a wireless access network node 110, or multiple wireless access network nodes 110.

Next, the wireless device WD1 determines (at 206), based on the received advertisement information 120, whether the wireless device WD1 shares a common interest with the wireless device WD2.

Note that task 202 can be performed before tasks 204 and 206, or alternatively, tasks 204 and 206 can be performed before task 202. If task 202 is performed before tasks 204 and 206, then proximity is determined before common interest discovery. On the other hand, if tasks 204 and 206 are performed before task 202, then common interest discovery is performed before proximity determination.

In response to the determining of the specified proximity and the determining of sharing the common interest, the wireless device WD1 can establish (208) a D2D link with the wireless device WD2.

In other implementations, rather than establishing a D2D link as performed at 208, the first wireless device can perform a different action in response to determining the specified proximity and determining the sharing of the common interest.

FIG. 2 depicts an example where the common interest determination (including tasks 204 and 206) is performed at a wireless device. In other implementations, discussed in connection with FIG. 6, for example, common interest determination for determining whether wireless devices share a common interest can be performed by a node of the terrestrial wireless network 102, such as by a wireless access network node 110.

D2D Inter-Device Session Establishment

A session for communicating data between wireless devices over a D2D link can be referred to as a D2D inter-device session. Generally, establishment of a D2D inter-device session can involve the following phases.

A first phase is a Registration phase, in which a D2D-capable wireless device provides the network with the wireless device's identity and other information that may be used in subsequent phases.

A second phase is an Interest Discovery phase. The Interest Discovery phase determines whether two or more wireless devices share a common interest.

A third phase is a Proximity Detection phase, which determines whether the wireless devices are within range of each other's transmission and thus would be able to establish a D2D links. Note that the Interest Discovery phase can be performed before the Proximity Detection phase, or vice versa.

A fourth phase is an Establishment phase, in which D2D radio resource specifications are determined and an appropriate set of radio resources is assigned to the D2D link for use by the wireless devices.

Subsequently, an Information Exchange phase exchanges data between the communicating wireless devices over the D2D links. The information exchanged may include supervisory signals (e.g. reference signals), control plane messages, and/or user plane messages.

Finally, a Release phase terminates communications over the D2D link and releases all radio resources committed to the D2D link.

Figure 3:
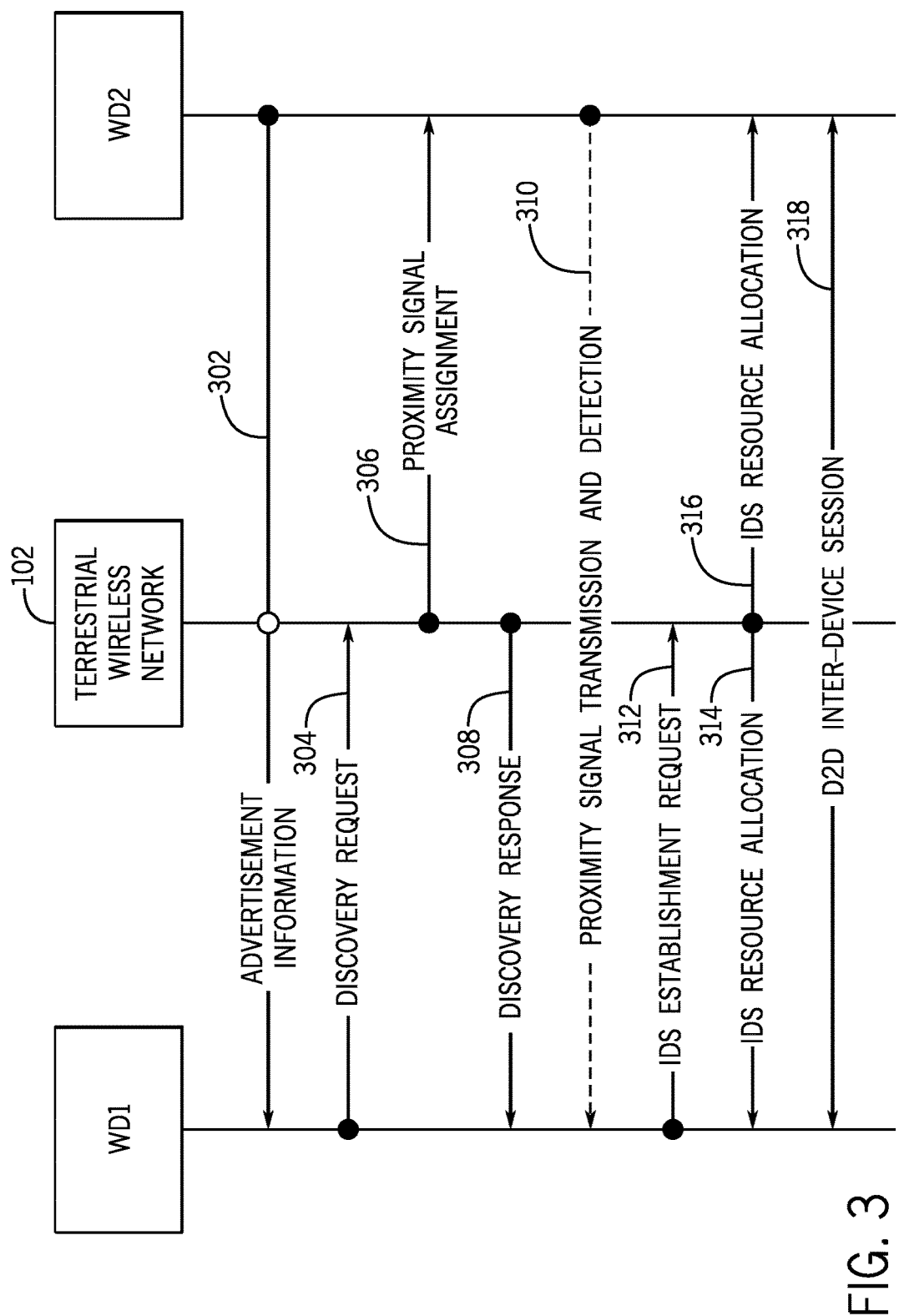
FIGS. 3-7 are message flow diagrams for establishing a device-to-device (D2D) session based on determining proximity and common interest, in accordance with some implementations.

As noted above, in some implementations, a D2D inter-device session can be initiated based on first performing the Interest Discovery phase followed by the Proximity Detection phase. FIG. 3 illustrates an example of such a procedure, which includes messages communicated among the wireless device WD1, a node of the terrestrial wireless network 102, and the wireless device WD2. The node of the terrestrial wireless network can be any or some combination of the nodes in the terrestrial wireless network 102, including the wireless access network nodes 102, packet gateway 112, and mobility management module 114 (FIG. 1).

As shown in FIG. 3, the wireless device WD2 sends (at 302) advertisement information (e.g. 120 in FIG. 1) to the terrestrial wireless network 102, where the advertisement information includes items associated with the wireless device WD2 that the wireless device WD2 is willing to publicize to other wireless devices. The items in the advertisement information can describe capabilities of the wireless device WD2, information available on or through the wireless device WD2, applications and services offered by or through the wireless device WD2, or identifiers associated with the wireless device WD2. The advertisement information may be sent (at 302) directly by the wireless device WD2 to the wireless device WD1 (e.g. the advertisement information may be broadcast to other wireless devices). Alternatively, the advertisement information can first be sent by the wireless device WD2 to the terrestrial wireless network 102, followed by the terrestrial wireless network 102 sending the advertisement information to the wireless device WD1.

Based on the received advertisement information, the wireless device WD1 determines whether the wireless device WD1 shares a common interest with the wireless device WD2. If so, the wireless device WD1 sends (at 304) a discovery request to the terrestrial wireless network 102, for the purpose of ascertaining the proximity of the wireless device WD2. The discovery request can identify the advertisement information detected by the wireless device WD1. In examples where the advertisement information is broadcast by the wireless device WD2 directly to other wireless devices, including the wireless device WD1, the advertisement information may also be used by a receiving wireless device as an indication that the wireless device WD2 is in close proximity. In such an example, the advertisement information 120 is also used as the proximity detection signal 118 (FIG. 1).

In response to receipt of the discovery request, the terrestrial wireless network 102 may send (at 306) instructions to the wireless device WD2, which is the wireless device associated with the advertisement information identified in the discovery request. The instructions can include a proximity signal assignment to cause the wireless device WD2 to begin transmitting a proximity detection signal (e.g. 118 in FIG. 1) that can allow other wireless devices to determine their proximity to the wireless device WD2. In some implementations, the wireless device WD2 may be continuously transmitting a proximity detection signal, in which case the terrestrial wireless network 102 would not have to send (at 306) instructions to the wireless device WD2.

In some examples, the proximity detection signal transmitted by the wireless device WD2 may be a signal that is specifically intended for use in proximity detection. In further examples, an existing reference or other signal transmitted by the wireless device WD2 may serve as a proximity detection signal.

In response to the discovery request (at 304), the terrestrial wireless network 102 sends (at 308) a discovery response to the wireless device WD1 that includes the identity of the proximity detection signal being transmitted by the wireless device WD2. In examples where the wireless device WD2 is continuously transmitting a proximity detection signal, the identity of the proximity detection signal may be included in the advertisement information sent at 302, or the identity of the proximity detection signal may be included in an associated broadcast from the terrestrial wireless network 102, which would allow the discovery request and discovery response messages at 304 and 308 to not have to be communicated.

Once the wireless device WD1 has determined the identity of a proximity detection signal associated with the advertising wireless device (WD2), the wireless device WD1 tries to detect (at 310) the proximity detection signal transmitted by the wireless device WD2. If the wireless device (WD1) is successful in detecting the proximity detection signal from the wireless device WD2, the wireless device WD1 sends an inter-device session (IDS) establishment request (312) to the terrestrial wireless network 102 for establishing a D2D inter-device session between the wireless devices WD1 and WD2. The IDS establishment request may include a channel quality indication derived from the detected proximity detection signal.

Based on the channel quality indication, the terrestrial wireless network 102 can determine that the wireless devices are close enough to establish a D2D link. If so, the terrestrial wireless network 102 allocates radio resources, such as uplink radio resources, for the D2D link. More specifically, in an LTE network, the terrestrial wireless network 102 can assign radio resources on the physical uplink shared channel (PUSCH) to the D2D inter-device session (IDS). The resource allocation can be provided in resource allocation messages sent at 314 and 316 from the terrestrial wireless network 102. The resource allocation messages can also include configuration information relating to the inter-device session, which can be provided to the wireless devices WD1 and WD2.

At this point, information can be exchanged (at 318) between the wireless devices WD1 and WD2 in the D2D inter-device session.

Figure 4:
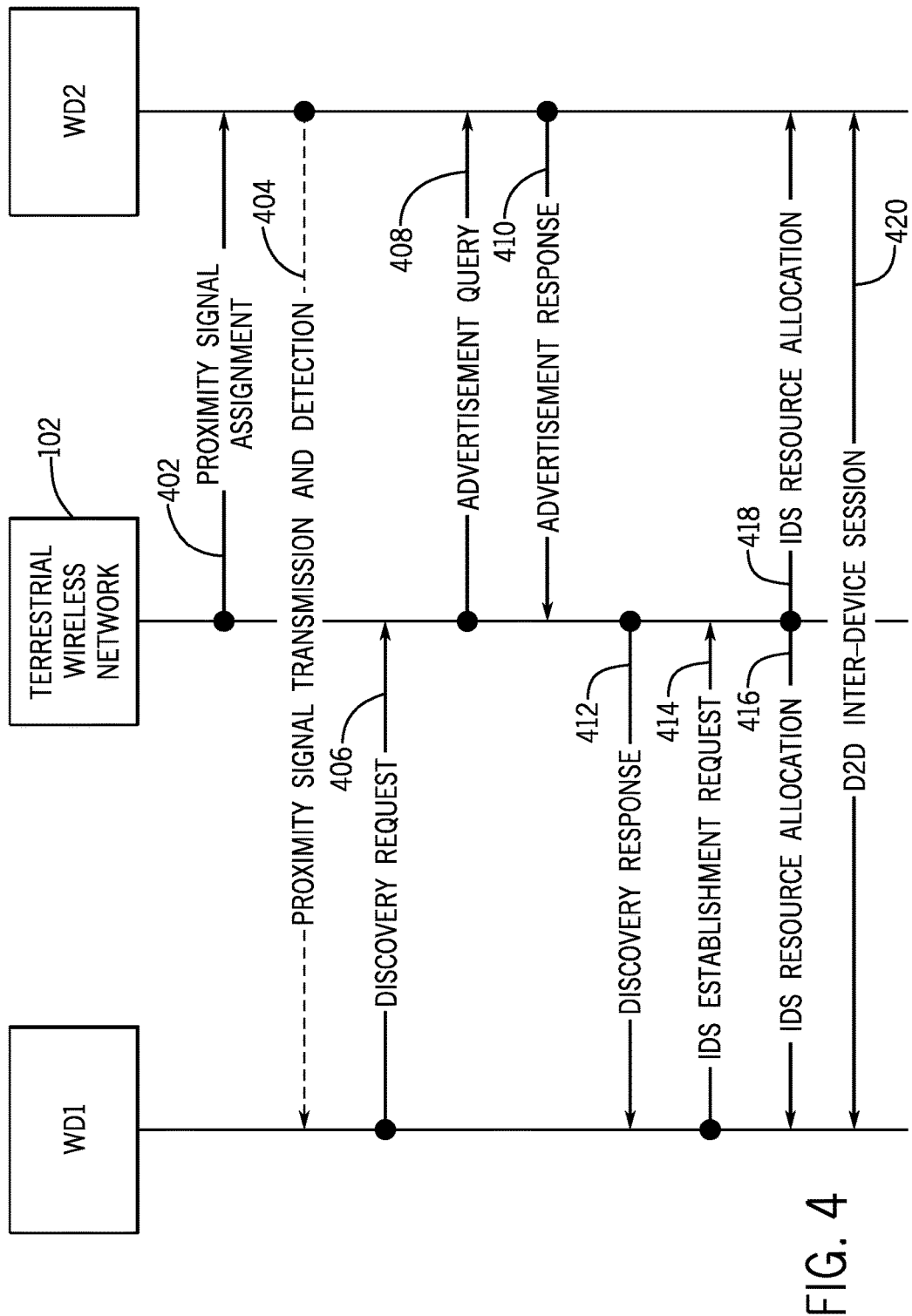

In alternative implementations, instead of first performing the Interest Discovery phase followed by the Proximity Detection phase, a D2D inter-device session can be initiated based on first performing the Proximity Detection phase followed by the Interest Discovery phase, as depicted in FIG. 4.

In FIG. 4, the terrestrial wireless network 102 sends (at 402) instructions to the wireless device WD2, where the instructions can include a proximity signal assignment to cause the wireless device WD2 to transmit a proximity detection signal. In some examples, the wireless device WD2 may continuously transmit a proximity detection signal, in which case the instructions would not have to be sent at 402.

The wireless device WD1 can detect (at 404) the proximity detection signal transmitted by the wireless device WD2. In some examples, the wireless device WD1 can operate in a promiscuous mode, and can be continually searching for proximity detection signals from other wireless devices.

To determine whether the wireless device WD1 shares a common interest with the detected wireless device WD2 (based on detecting the proximity detection signal transmitted by the wireless device WD2), the wireless device WD1 sends (at 406) a discovery request to the terrestrial wireless network 102, where the discovery request can include the identity of the detected proximity detection signal. In some examples, the wireless device WD2, may have, during the Registration phase discussed above, provided the terrestrial wireless network 102 with advertisement information regarding items publicized by the wireless device WD2. If this advertisement information is already available at the terrestrial wireless network 102, the terrestrial wireless network 102 can send (at 412) a discovery response to the requesting wireless device WD1, which includes the advertisement information provided in a Registration phase by the wireless device WD2.

However, if the advertisement information was not previously received by the terrestrial wireless network 102, the terrestrial wireless network 102 can send (at 408) an advertisement query to the wireless device WD2, in response to the discovery request (at 406). The advertisement query is sent to the wireless device associated with the detected proximity detection signal, which in the FIG. 4 example is the wireless device WD2. In response to the advertisement query, the wireless device WD2 can send (at 410) its advertisement information in an advertisement response to the terrestrial wireless network 102.

The advertisement information included in the advertisement response can then be included in the discovery response sent (at 412) to the wireless device WD1.

The remaining tasks 414, 416, 418, and 420 are similar to respective tasks 312, 314, 316, and 318 in FIG. 3.

Figure 5:
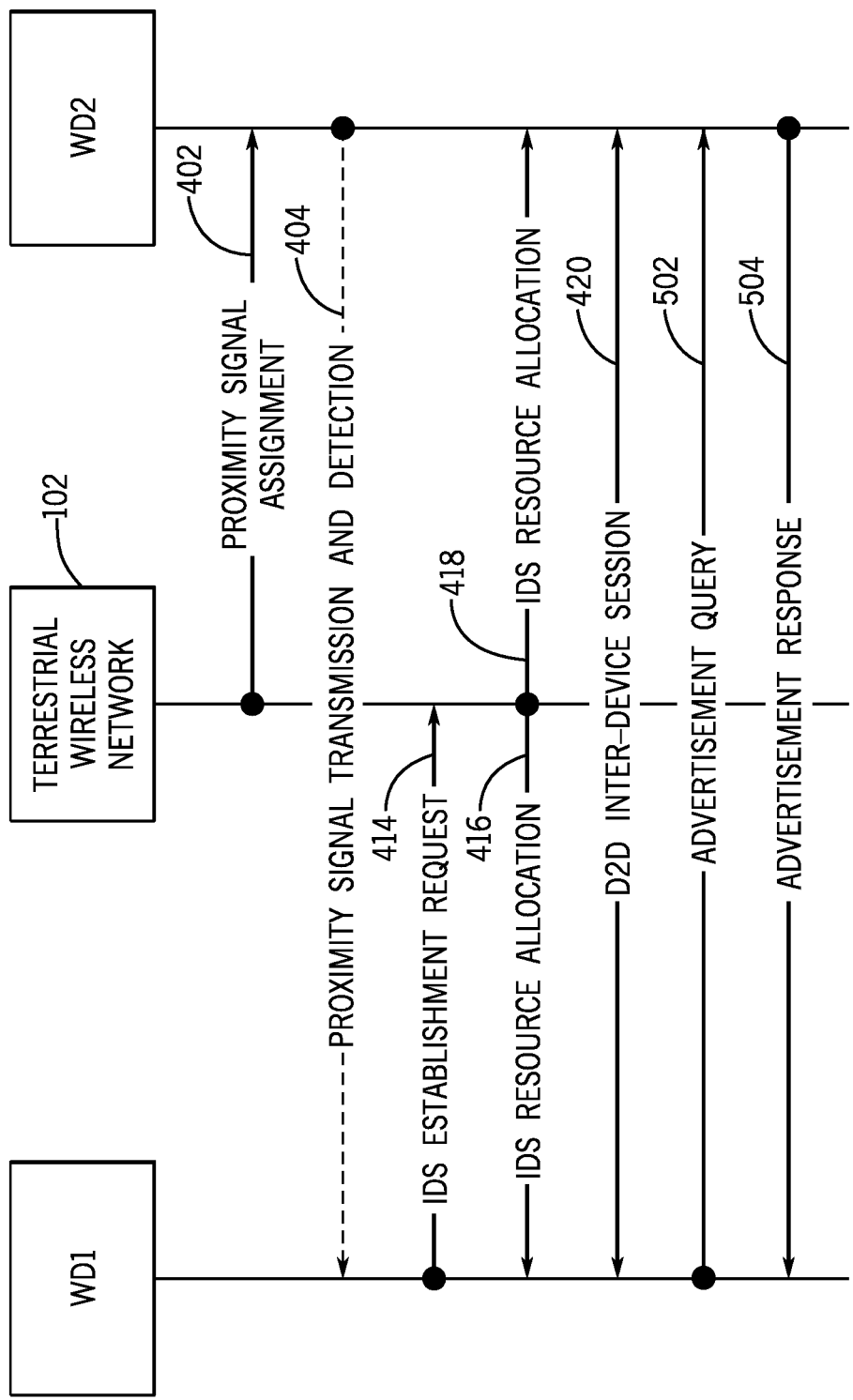

In alternative implementations, the flow of FIG. 4 can be modified, to cause the determination of common interest to be performed after the establishment of the D2D link between the wireless devices WD1 and WD2. This flow is depicted in FIG. 5. In FIG. 5, tasks 402 and 404 are the same as tasks 402 and 404, respectively, in FIG. 4. After detecting (at 404) the proximity detection signal sent by the wireless device WD2, the wireless device WD1 can send (at 414) the IDS establishment request, which causes the performance of tasks 414, 416, 418, and 420 as in FIG. 4.

Once the wireless devices WD1 and WD2 are able to communicate with each other (at 420) over the D2D link, the wireless device WD1 sends (at 502) an advertisement query to the wireless device WD2, over the D2D link. In response, the wireless device WD2 can send (at 504) an advertisement response back to the wireless device WD1, where the publication response contains the advertisement information of the wireless device WD2.

Identifiers and Handles

In some implementations, each wireless device k is provided with at least one identifier $u_k$ that uniquely identifies the wireless device within a given context. Examples of the identifier of a wireless device can include any of the following: an LTE Cell Radio Network Temporary Identifier (C-RNTI) (which is an example of a local, temporary identifier within the context of a single cell; or International Mobile Equipment Identity (IMEI) (which is an example of a unique identifier within a global context), or any other identifier. In general, a wireless device k may be assigned one or more global identifiers uk and one or more local identifiers uk; the symbol $u_k$ is used throughout this discussion in scenarios where the identifier may be either global or local.

The determination of whether wireless devices share a common interest can be based on matching handles. A handle can identify an item that is to be publicized by the wireless device for the purpose of establishing whether or not wireless devices share a common interest. In such implementations, the advertisement information (120 in FIG. 1) sent by a wireless device can include the handles (rather than the items).

Two wireless devices are said to have a common interest if a handle publicized by one wireless device (the provider) is being sought by another wireless device (the client). In this discussion, a "handle" can refer to either a handle or a handle reference. A handle reference is a compact form of a handle and may be used instead of a handle, for example, to reduce the size of a control or broadcast message containing the handle reference. Note that discovery of a common interest is not limited to devices that are already known to one another; the solutions in this document also address discovery of wireless devices that may not be known a priori.

In some implementations, a wireless device p (WDp) acting as a provider of items of interest is associated with one or more tuples of the form $(h_i, u_p)$, where $h_i$ is a handle that identifies an item pertaining to the wireless device. A provider wireless device WDp may be associated with a set of n handles: $\{(h_i, u_p), i=1 \ldots n\}$, where $n \geq 1$. A handle h may be associated with a set of m ($m \geq 1$) devices or their identifiers: $\{(h, u_j), j=1 \ldots m\}$.

A handle may refer to an attribute of the wireless device WDp, or information offered by (or through) the wireless device WDp, or an affiliation (of the user) of the wireless device WDp, or an application of the wireless device WDp, or a service offered by (or through) the wireless device WDp, or an identifier associated with (the user of) the wireless device WDp. Some examples of handles include:
- a publicly available user or device identifier such as a Mobile Station International Subscriber Directory Number (MSISDN), a Session Initiation Protocol (SIP) uniform resource identifier (URI), a fully qualified domain name (FQDN), an email address, or any other identifier;
- an identifier of an affiliated organization or group;
- a topic label or tag;
- a geolocation code;
- a structured identifier encoded as:
  - a URI string;
  - an Extensible Markup Language (XML) construct;
  - an Abstract Syntax Notation One (ASN.1) construct; and so forth;
- a Secure Hash Algorithm (SHA) hash of a long name or structured identifier;
- a bitmap of supported capabilities;
- a sequence of attributes and their values;
- an application-specific identifier;
- an access class; and
- a device category.

In some implementations, a network may provide a wireless device with a handle reference that may be used in place of a handle in some instances. A handle reference is a compact form of a handle.

In some examples, a wireless device may provide the terrestrial wireless network 102 with a handle $h_i$ and may receive a handle reference $r_i$ in return; this exchange may occur, for example, using NAS (non-access stratum) signaling during the Registration phase. NAS signaling is provided by an NAS entity in a wireless device or a wireless access network node. The NAS entity provides session management to enable connectivity between a wireless device and an upper-level layer of a wireless access network node, or in the D2D context, between wireless devices.

The mapping $(h_i, r_i)$ may be distributed by the terrestrial wireless network 102 to other wireless devices either through a broadcast (e.g. in a System Information Block (SIB), or over a Multimedia Broadcast Multicast Service (MBMS) channel, or in a dedicated NAS message, or in another message.

In other implementations, a set of mappings $\{h_i, r_i\}$, $i=1, \ldots$, may be contained in a dictionary or other data structure that is preconfigured into a wireless device, or downloaded to a wireless device, or queried by the wireless device.

While a handle $h_i$ may have a broad (possibly global) scope, the scope of a handle reference $r_i$ may be constrained; for example, a given reference $r_i$ may only be valid within a single wireless access network.

The terrestrial wireless network 102 can request and maintain information to match wireless devices that publicize a handle with wireless devices that are seeking that handle. A wireless device may send a query to the terrestrial wireless network 102 regarding the presence of another wireless device, with a corresponding handle of interest. Handle announcements can be transmitted by the terrestrial wireless network 102 to wireless devices or directly by a wireless device to indicate that a wireless device has an interest in a handle. The presence of one or more wireless devices with an interest in a handle or a group of handles may be indicated by the one or more wireless devices.

Proximity Detection Resources

Proximity detection signals may be used to perform two forms of proximity detection: (1) beaconing is a process in which a wireless device (WD1) unilaterally announces its presence through the transmission of a proximity detection signal; and (2) ranging is a process in which a wireless device (WD1) explicitly looks for the proximity detection signal of another wireless device (WD2)—ranging may be mutual with WD2 explicitly looking for the proximity detection signal of WD1.

In some examples, beaconing may be based on a proximity detection signal that is assigned to a particular wireless device; in other implementations, beaconing may be based on a proximity detection signal that is shared amongst a number of wireless devices.

In further examples, ranging may be based on a proximity detection signal that is assigned to a particular wireless device. Ranging may utilize proximity detection signals used exclusively for proximity detection, or ranging may utilize signals that have multiple purposes, or ranging may utilize signals that have another purpose and are used opportunistically for proximity detection. For example, a signal used for ranging may also allow a receiving wireless device to measure the quality of a received transmission and, optionally, to provide feedback to the transmitting wireless device; such measurements can then be used to govern subsequent transmissions between the wireless devices.

In some examples, a proximity detection signal may not contain any information that can be used to directly identify the wireless device that is transmitting the signal. As such, the proximity detection signal in these examples may be used only to determine that the transmitting wireless device is in close proximity to a detecting wireless device.

In such examples, a decision on whether to establish a D2D link may be taken based on other information that is available to the detecting wireless device; for example, the proximity detection signal may be matched to information supplied by the terrestrial wireless network 102 (discussed further below).

In other examples, a decision on whether to continue communicating in a D2D link may be made by a higher-layer entity in the wireless devices after the D2D link has been established and qualifying information has been exchanged between the wireless devices (discussed further below).

In other implementations, a wireless device identifier $u_k$, or a handle $h_i$, or a handle reference $r_i$ may be encoded in a proximity detection signal, which allows the proximity detection signal to be used for both common interest and proximity detection.

In some implementations, a wireless device may transmit its proximity detection signal over a specific set of radio resources. The combination of a proximity detection signal and its associated radio resources can be referred to as a proximity detection resource (PDR). A proximity detection resource used by a wireless device may employ some combination of frequency, time and code multiplexing.

A wireless device can monitor one or more proximity detection resources to determine whether the wireless device has detected a proximity detection signal transmitted by another wireless device. A wireless device can also monitor a specified proximity detection resource to determine whether the wireless device can receive a common proximity detection signal (beacon) that may be simultaneously transmitted by one or more other wireless devices.

Alternatively, a first wireless device can monitor a radio resource that has been configured for use in a response to be transmitted by another wireless device as part of a discovery procedure (which is a procedure performed to allow one wireless device to detect close proximity of another wireless device). If the first wireless device can detect signaling in the monitored radio resource, then such signaling serves as an implicit proximity detection signal. As another example, a wireless device can monitor a specific proximity detection resource provided by the terrestrial wireless network 102 to determine whether the wireless device can receive a proximity detection signal being transmitted by a specific wireless device.

Network-Based Interest Matching

In the foregoing discussion, reference is made to a wireless device performing the Interest Discovery phase for determining whether wireless devices share a common interest. In alternative implementations, the determination of whether wireless devices share a common interest can instead be performed at the terrestrial wireless network 102, such as by the wireless access network node 110 or by any other node in the terrestrial wireless network 102.

In some implementations, the terrestrial wireless network 102 may maintain a cache of handles publicized by wireless devices as well as a cache of handles being sought by wireless devices within the terrestrial wireless network's coverage area(s). A cache can refer to any storage medium (or storage media) that is used to store information. The terrestrial wireless network 102 may use this cache to identify wireless devices that may have a common interest.

In some examples, a handle (or set of handles) may be supplied to the terrestrial wireless network 102 by a wireless device using NAS signaling during the Registration phase. In other examples, a wireless device may update the handle (or set of handles) after the Registration phase by sending a NAS message on its uplink to the terrestrial wireless network; this update may, for example, be the result of an action of an application running on the wireless device, or of input from the user, or of a change in location of the wireless device. The handle (or set of handles) that is supplied or updated may correspond to handle(s) being publicized or handle(s) being sought by the wireless device.

In some implementations, a wireless device may use NAS signaling to provide the terrestrial wireless network 102 with policies that govern which wireless devices may be considered by the terrestrial wireless network when determining common interests. In other examples, those policies may be provided to the terrestrial wireless network 102 through operator configuration.

Figure 6:
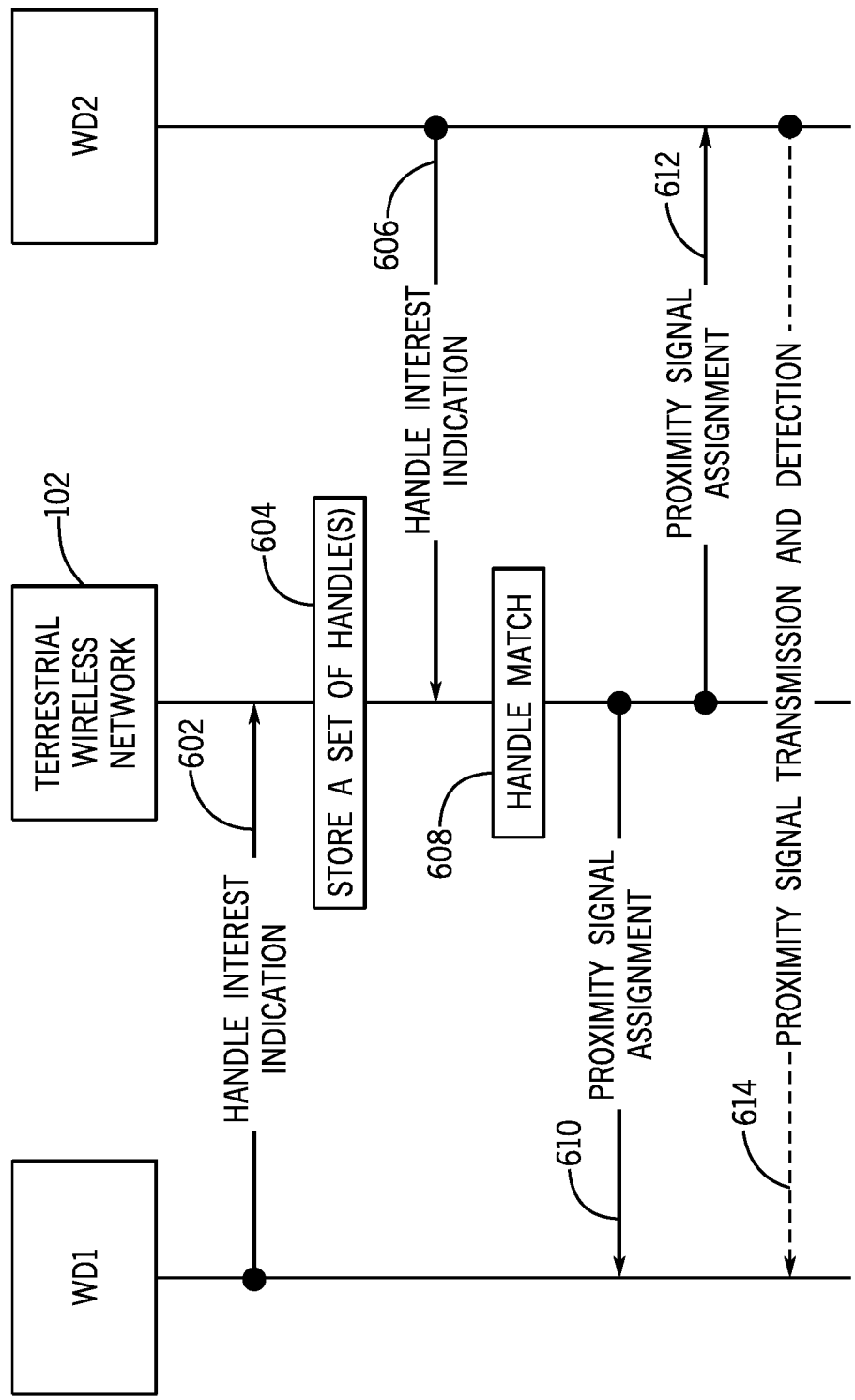

FIG. 6 depicts an example process for performing the Interest Discovery phase at the terrestrial wireless network 102. The wireless device (WD1) may send (at 602) a message (e.g. NAS message or another message, such as a message sent during the Registration phase) containing a Handle Interest Indication on the uplink to the terrestrial wireless network 102. The Handle Interest Indication may contain a set of handle(s), $\{h_p^1\}$, being publicized by the wireless device WD1. Additionally, the Handle Interest Indication may also or alternatively contain a set of handle(s), $\{h_s^1\}$, being sought by the wireless device WD1. The content of either set $\{h_p^1\}$ or $\{h_s^1\}$ may be empty, which would indicate that the wireless device WD1 is not, respectively, publicizing any handles or seeking any handles.

The terrestrial wireless network 102 can store (at 604) the handle(s), if any, contained in the Handle Interest Indication (602) in a cache at the terrestrial wireless network 102.

Another wireless device (WD2) may send (at 606) a Handle Interest Indication (using an NAS message or a message of the Registration phase, for example) containing a set of handle(s), $\{h_p^2\}$, being publicized by WD2 and a set of handle(s), $\{h_s^2\}$, being sought by the wireless device WD2.

Using its cache, the terrestrial wireless network 102 performs (at 608) a handle match to determine whether any of the handle(s) being publicized by WD2 are being sought by other wireless devices (e.g. WD1), and whether any of the handle(s) being sought by WD2 are being publicized by other wireless devices (e.g. WD1).

For example, the terrestrial wireless network 102 may determine that WD1 and WD2 have a common interest if one or more handles publicized by WD1 are being sought by WD2—i.e. $\{h_p^1\} \cap \{h_s^2\} = \{h_{12}\} \neq \emptyset$.

Similarly, the terrestrial wireless network 102 may determine that WD1 and WD2 have a common interest if one or more handles publicized by WD2 are being sought by WD1—i.e. $\{h_p^2\} \cap \{h_s^1\} = \{h_{21}\} \neq \emptyset$.

If the terrestrial wireless network 102 finds a non-empty set of matching handles $\{h_{12}\}$ and/or $\{h_{21}\}$ in the handle match performed at 608, the terrestrial wireless network 102 may assign proximity detection resources to the wireless devices WD1 and WD2, respectively, using dedicated AS (access stratum) radio resource configuration messages (e.g. radio resource control (RRC) messages or medium access control (MAC) control elements). In addition, the terrestrial wireless network 102 can instruct (at 610, 612) the wireless devices WD1 and WD2 to begin proximity detection (at 614) in preparation for a D2D inter-device session.

In some examples, the network may also provide the wireless devices with the non-empty set of matching handles $\{h_{12}\}$ and/or $\{h_{21}\}$ that precipitated the proximity detection.

Wireless Device Interest Discovery before Proximity Detection

Figure 7:
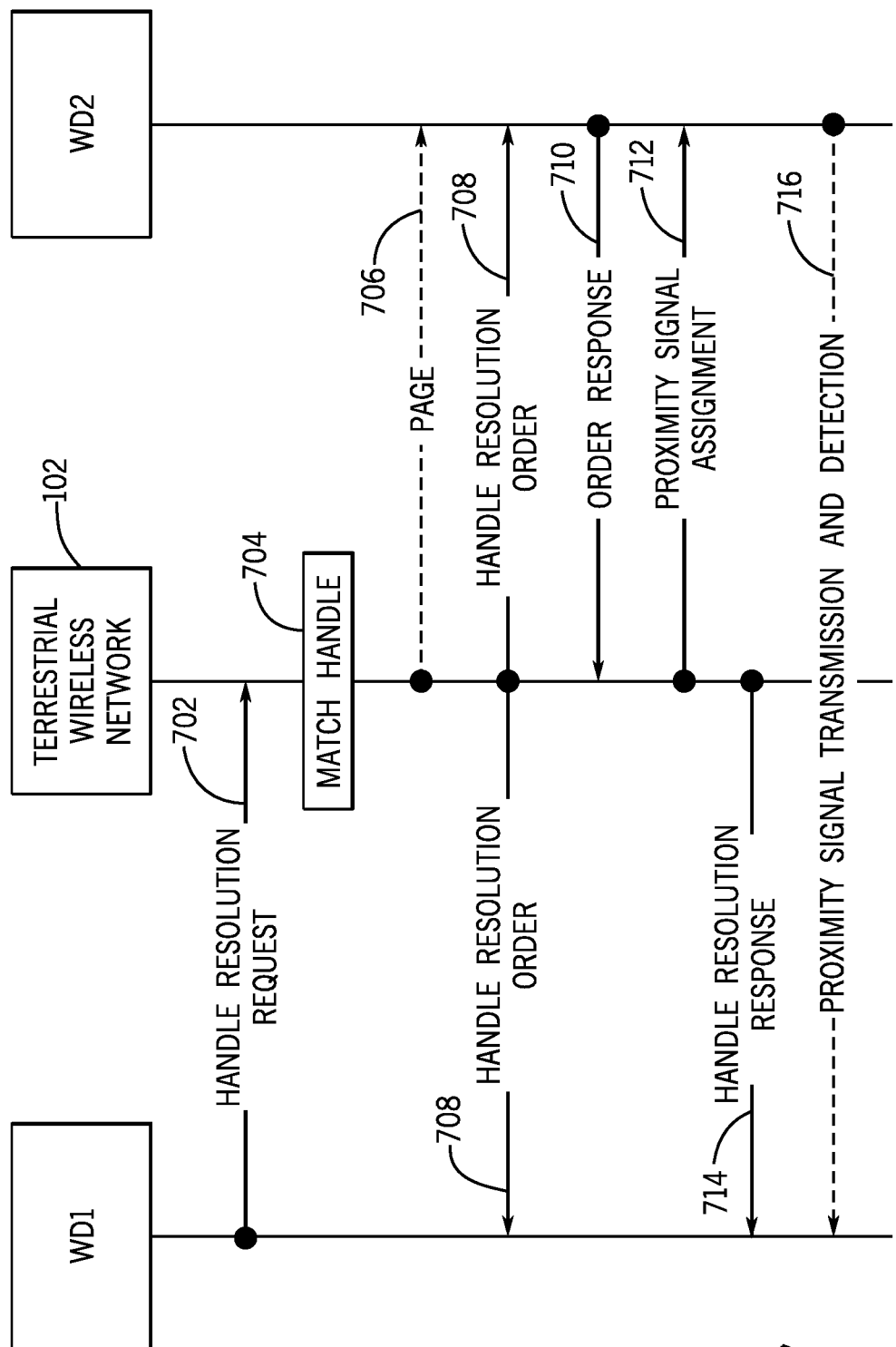

Instead of performing network-performed interest discovery, the determination of common interest can be performed at a wireless device, such as wireless device WD1 in FIG. 7, in a procedure in which the Interest Discovery phase is performed before the Proximity Detection phase. In some examples, the wireless device (WD1) may know a handle $h_2$ associated with wireless device (WD2) but may not know whether the wireless device WD2 is currently within range of WD1's transmissions.

As shown in FIG. 7, the interrogating wireless device (WD1) may send (at 702) a Handle Resolution Request message on the uplink to the terrestrial wireless network 102. The request contains the handle being interrogated (e.g. $h_2$).

In some implementations, the terrestrial wireless network 102 may maintain a cache of handles publicized by the wireless devices within its coverage area(s). If the terrestrial wireless network 102 finds a handle matching $h_2$ in its cache, in a handle match process (at 704), the following may be performed:

If the matching handle is associated with one or more wireless devices (e.g. WD2) that are in a connected state (i.e. actively exchanging information with the terrestrial wireless network 102), then the terrestrial wireless network 102 may provide (at 714) a positive Handle Resolution Response message to the wireless device WD1 (tasks 706, 708, 710, and 712 can be skipped).

If the matching handle is associated with one or more wireless devices that are not in a connected state (i.e. not actively exchanging information with the network) then:

in some examples, the terrestrial wireless network 102 may initiate paging (at 706) of the target wireless device(s).

If the terrestrial wireless network 102 receives a response to its page, then the terrestrial wireless network 102 may provide (at 714) a positive Handle Resolution Response message to the wireless device WD1 (while skipping tasks 708, 710, and 712).

If the terrestrial wireless network does not maintain a handle cache, or if the terrestrial wireless network does not find a matching handle in its cache, or if the wireless device(s) associated with a matching handle is not in a connected state and the wireless device(s) do(es) not respond to the page sent at 706, then the terrestrial wireless network 102 may broadcast (at 708) a Handle Resolution Order message to multiple wireless devices in the coverage area of the terrestrial wireless network 102. The Handle Resolution Order message can be sent in a portion of the physical downlink shared channel (PDSCH) referenced by a pre-configured Radio Network Temporary identities (RNTI) (this RNTI is referred to as a Handle Resolution RNTI, HR-RNTI) in a Downlink Control Information (DCI) of the physical downlink control channel (PDCCH). This is similar to the Paging Control Channel (PCCH) mechanism used in LTE to page a wireless device using the wireless device's international mobile subscriber identity (IMSI).

In some examples, the Handle Resolution Order message may include proximity detection resource configuration parameters to be used by the target wireless device (WD2).

Wireless devices that support handle resolution monitor the PDCCH for the HR-RNTI and may retrieve the handle(s) contained in the corresponding Handle Resolution Order. If a wireless device (WD2) that is monitoring the HR-RNTI detects a handle that matches one of WD2's publicized handle(s), the wireless device WD2 may provide (at 710) an Order Response message (e.g. with WD2's C-RNTI) to the terrestrial wireless network 102 using an uplink resource that either is explicitly scheduled by the terrestrial wireless network 102 or is tied to the Handle Resolution Order message in a predetermined manner.

In some examples, the Handle Resolution Order message may also include a dedicated preamble or a preamble partition to be used by a target wireless device (WD2) when responding to the Handle Resolution Order message via a Physical Random Access Channel (PRACH).

If the terrestrial wireless network 102 receives one or more responses to its Handle Resolution Order message, the following can be performed:

In some examples, the terrestrial wireless network 102 may send (at 712) a proximity signal assignment to cause the wireless device WD2 to begin transmitting a proximity detection signal. The terrestrial wireless network may also return (at 714) a positive acknowledgement, in the form of a Handle Resolution Response, to the interrogating wireless device (WD1), which may include proximity detection resource configuration parameters to be used by the wireless device WD1 as well a list of proximity detection signals used by wireless devices (including WD2) publicizing the requested handle ($h_2$). The wireless devices WD1 and WD2 may then begin proximity detection (at 716) in preparation for a D2D inter-device session.

In other examples, the wireless device WD1 may directly monitor the uplink resource allocated for responses to the Handle Resolution Order message; if the wireless device WD1 detects a response to its Handle Resolution Request (702), the wireless device WD1 can deduce that a target wireless device (WD2) is in close proximity. The wireless device WD1 may then send a request to the terrestrial wireless network 102 for the establishment of a D2D inter-device session based on reception of the response from WD2.

In further examples, the terrestrial wireless network 102 may assign proximity detection resources and instruct the wireless device WD1 and all wireless devices (including WD2) publicizing the requested handle ($h_2$) to begin proximity detection (at 718) in preparation for a D2D inter-device session. Initiation of proximity detection is deemed by the wireless device WD1 to be an implicit positive acknowledgement to its Handle Resolution Request (702). In variants of this example, additional information regarding the wireless device WD1 (such as its identifier or capabilities) may be included in the message to the wireless device WD2 (and to all other wireless devices publicizing $h_2$); this may allow the wireless device WD2 to decide, for example, whether to advertise its presence to the wireless device WD1 or to hide its proximity from the wireless device WD1.

In other examples, the terrestrial wireless network 102 may assign a Common Proximity Beacon (discussed further below) to all wireless devices (including WD2) publicizing the requested handle ($h_2$) and instruct the wireless device WD1 to begin proximity detection (at 718) in preparation for a D2D inter-device session. Initiation of proximity detection is deemed by the wireless device WD1 to be an implicit positive acknowledgement to its query.

Handle Announcement

In some implementations, the handle(s) publicized by a wireless device may be broadcast to other wireless devices in the vicinity of the transmitting wireless device through advertisement information contained in a Handle Announcement Channel (HACH). Similarly, the handle(s) sought by a wireless device may be broadcast to other wireless devices in the vicinity of the transmitting wireless device through advertisement information contained in a HACH.

In some implementations, one or more Handle Announcement Channels may be configured within the D2D radio resources (e.g. resources of the LTE PUSCH) by the terrestrial wireless network 102. An HACH configuration may be broadcast (e.g. in a System Information Block, SIB) or contained in a dedicated AS radio resource configuration message (e.g. an RRC message or a MAC control element). In other implementations, Handle Announcement Channels may be dynamically scheduled within the D2D radio resources by the terrestrial wireless network 102 using a pre-configured RNTI (the Handle Announcement RNTI, HA-RNTI, discussed above), such as in a DCI of the PDCCH.

In further examples, advertisement information may be categorized and each category of advertisement information may be assigned to a specific HACH or set of HACHs; the assignments may be broadcast by the terrestrial wireless network (e.g. in a SIB), or configured through a dedicated AS radio resource configuration message, or preconfigured into a wireless device. In other examples, advertisement information may not be categorized and may be assigned to a HACH (from among multiple HACHs) based, for example, on current system load and the resource specifications of the announcement.

An Interest Discovery phase using information sent in a HACH may use the following example process. In some examples, an announcing device (e.g. WD1) may send a Handle Announcement Request on the uplink to the terrestrial wireless network 102. The Handle Announcement Request may include a category of the advertisement information, the desired periodicity of the announcement of the advertisement information, the number of repetitions of the announcement, and/or the timeframe over which the announcement is to be made.

In other examples, the wireless device WD1 may send the Handle Announcement Request to the terrestrial wireless network 102 during the Registration phase.

When the requested announcement has been scheduled, the terrestrial wireless network 102 may send a transmission grant to the wireless device WD1; if a periodic announcement has been requested by WD1, the transmission grant may take the form of a semi-persistent scheduling grant. For example, the DCI for the transmission grant can reference one of the Handle Announcement Channels previously configured by the network.

At the scheduled time, the wireless device WD1 may transmit a handle over the allocated HACH along with an indication of whether the handle is being publicized or sought. Other wireless devices that are interested in receiving handle announcements may use the HACH information, configured via a broadcast message (e.g. in a SIB), or through a dedicated AS radio resource configuration message, or signaled via the HA-RNTI, to monitor transmissions on the Handle Announcement Channels.

In some examples, the handle announcement may also include the proximity detection resource used by the wireless device WD1.

If a wireless device (WD2) detects a handle announcement in which the wireless device WD2 is interested, the wireless device WD2 may respond to the terrestrial wireless network 102 (e.g. with its C-RNTI) using an uplink resource that either is explicitly scheduled by the terrestrial wireless network 102 or is tied to the Handle Announcement Request in a predetermined manner.

In some examples, the terrestrial wireless network 102 may then assign proximity detection resources and instruct the wireless devices WD1 and WD2 to begin proximity detection in preparation for a D2D inter-device session.

In other examples, the wireless device WD1 may directly monitor a transmission resource allocated by the terrestrial wireless network 102 for responses to announcements made on the HACH; if the wireless device WD1 detects a response to its announcement, the wireless device WD1 can deduce that an interested device (WD2) is in close proximity. The wireless device WD1 may then send a request to the terrestrial wireless network 102 for the establishment of a D2D inter-device session.

In other examples where the handle announcement includes the proximity detection resource currently being used by the wireless device WD1, the wireless device WD2 may determine the proximity of the wireless device WD1 by monitoring transmissions on the proximity detection resource.

Handle Broadcast

In further implementations, the handle(s) publicized by a wireless device may be broadcast by the terrestrial wireless network 102 to all wireless devices through a Handle Broadcast Channel (HBCH).

One or more Handle Broadcast Channels may be configured by the terrestrial wireless network 102. The HBCH configuration may be broadcast (e.g. in a System Information Block, SIB) or contained in an AS radio resource configuration message (e.g. an RRC message or a MAC control element). In another example, Handle Broadcast Channels may be dynamically scheduled within the D2D radio resources by the terrestrial wireless network 102 using a pre-configured RNTI (the Handle Broadcast RNTI, HB-RNTI) in a DCI of the PDCCH. In other examples, a HBCH may be incorporated into an MBMS channel.

In some examples, announcements may be categorized and each category of advertisement information may be assigned to a specific HBCH or set of HBCHs. The assignments may be broadcast by a network (e.g. in a SIB), or configured through a dedicated AS radio resource configuration message, or pre-configured into a wireless device. In other examples, announcements may not be categorized and may be assigned to a HBCH based, for example, on current system load and the resource requirements of the announcement.

Interest Discovery via a HBCH may involve the following process.

In some examples, an announcing wireless device (e.g. WD1) may send a Handle Announcement Request on the uplink to the terrestrial wireless network 102. The Handle Announcement Request may include a handle, an indication of whether the handle is being publicized or sought, a category of the advertisement information, the desired periodicity of the announcement, the number of repetitions of the announcement, and/or the timeframe over which the announcements will be made.

In other examples, the wireless device WD1 may provide the terrestrial wireless network 102 with its Handle Announcement Request during the Registration phase.

When the requested announcement has been scheduled, the terrestrial wireless network 102 broadcasts the handle over a corresponding HBCH. In some examples, for each handle announcement, the terrestrial wireless network 102 may also include the proximity detection resource used by the wireless device associated with that announcement.

If a wireless device (e.g. WD2) detects a handle announcement in which the wireless device WD2 is interested, the following may be performed.

In some examples, the wireless device WD2 may send an IDS establishment request (discussed above) to the terrestrial wireless network 102; the terrestrial wireless network 102 may then assign proximity detection resources and instruct the wireless devices WD1 and WD2 to begin proximity detection in preparation for a D2D inter-device session.

In other examples, using the proximity detection resource information of the wireless device WD1 obtained from the handle announcement, the wireless device WD2 may monitor the proximity detection signal of the wireless device WD1 to determine whether the wireless device WD1 is within range.

In some implementations, the wireless device WD1 may send a Handle Announcement Cancellation Request on the uplink to the terrestrial wireless network 102 to terminate the handle announcement broadcast when the wireless device WD1 is no longer seeking wireless devices with a common interest in a specific handle.

Monitoring of Common Interest Beacons

In some implementations, sets of handles or other groupings are defined and a common proximity detection resource (beacon) is assigned to each grouping. As a result, the number of dedicated proximity detection resources (assigned to respective wireless devices) may be reduced.

A wireless device that is searching for potential partners within a particular grouping may monitor the Common Interest Beacon associated with that grouping and, if the wireless device detects a proximity detection signal, the wireless device can deduce that there is at least one other wireless device in proximity that is affiliated with that grouping.

Figure 8:
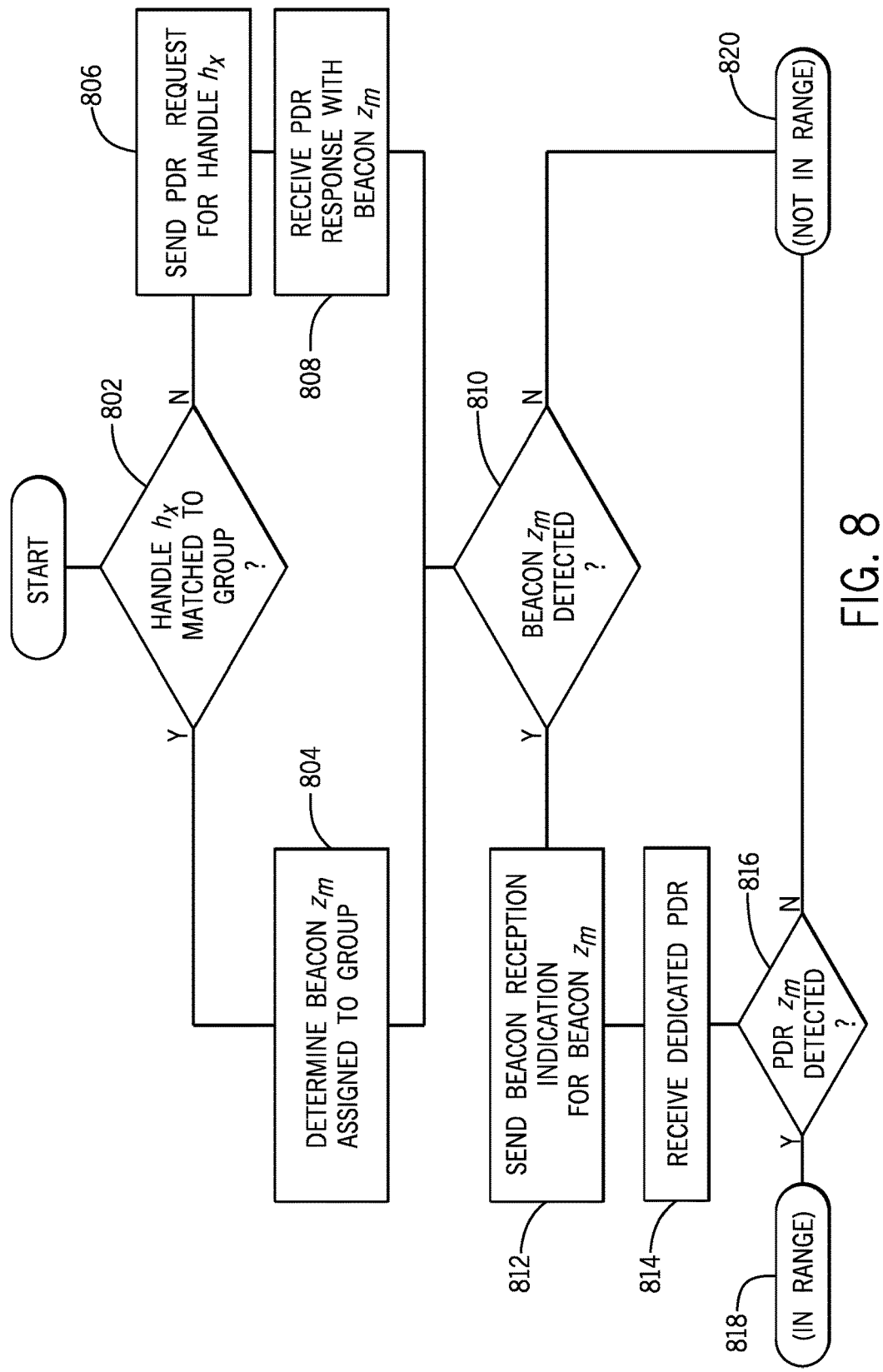
FIG. 8 is a flow diagram of a process of performing interest discovery using a common interest beacon, according to some implementations.

An Interest Discovery phase using a common interest beacon may involve the tasks associated with FIG. 8, for example.

In some examples the terrestrial wireless network 102 may distribute, to one or more wireless devices, a list of tuples of the form $(z_i, g_k)$ where $z_i$ is a proximity detection resource and $g_k$ is a grouping of interest that is known to the wireless devices. In some examples, the terrestrial wireless network 102 may also distribute a list of tuples of the form $(h_j, g_k)$, where $h_j$ is a handle (or its associated handle reference $r_j$) and $g_k$ is the grouping that encompasses the handle. The list of tuples $\{(h_j, g_k)\}$, or the list of tuples $\{(z_i, g_k)\}$, or both, may be distributed by the terrestrial wireless network 102 to wireless devices either through a broadcast message (e.g. in a System Information Block (SIB) or over an MBMS channel) or in a dedicated AS radio resource configuration message.

The wireless device (e.g. WD1) with an interest in a particular handle $h_x$ may use the distributed information to determine (at 802) whether a matching grouping can be found for $h_x$; in other words, the wireless device WD1 determines whether it has previously received the tuple ($h_x$, $g_n$) from the terrestrial wireless network 102. Alternatively, the wireless device WD1 may derive the grouping of interest $g_n$ through some other mechanism. If a match is found (at 802), the wireless device WD1 may then use the distributed information to determine (at 804) a matching proximity detection resource $z_m$ for the grouping $g_n$, as determined from the tuple $(z_m, g_n)$. This matching proximity detection resource $z_m$ can be used for transmitting, by the wireless device WD1, a beacon to proximate wireless devices with a similar interest.

However, if the wireless device WD1 is unable to match (at 802) the handle $h_x$ to any grouping, then the wireless device WD1 may send (at 806) a Proximity Detection Resource Request on the uplink to the terrestrial wireless network 102. The Proximity Detection Resource Request may include the handle $h_x$ (or its associated handle reference $r_x$), an indication of whether the handle is being publicized or sought, or a category of advertisement information. In response, the terrestrial wireless network 102 may provide the proximity detection resource $z_m$ associated with the grouping that encompasses the specified handle $h_x$. This proximity detection resource $z_m$ is received (at 808) by the wireless device 108.

The proximity detection resource $z_m$ may then be used by the wireless WD1 to transmit a beacon to proximate wireless devices with a similar interest.

In some examples, the wireless device (e.g. WD1) may wish to find proximate wireless devices with a common interest. A similar process as depicted tasks 802, 804, 806, and 808 can be performed.

In some examples, the wireless device WD1 with an interest in a particular handle $h_x$ may determine (at 802) if the handle can be matched to a respective grouping. If a match is determined, then the distributed tuples from the terrestrial wireless network 102 can be used to determine (at 804) a matching proximity detection resource from the tuple $(z_m, g_n)$.

However, if the handle $h_x$ cannot be matched (at 802) to a respective grouping, then the wireless device WD1 can send (at 806) a PDR Request on the uplink to the terrestrial wireless network 102, where the request contains the handle $h_x$ (or its associated handle reference $r_x$) or a category of the advertisement information. In response, the terrestrial wireless network 102 may provide the proximity detection resource $z_m$ to be monitored, which is received (at 808).

If a searching wireless device (WD1) detects (at 810) the proximity detection signal in the resource $z_m$, the following can be performed. The wireless device WD1 can send (at 812) a Beacon Reception Indication to the terrestrial wireless network 102 along with the identity of the proximity detection resource $z_m$ where the signal was detected. The terrestrial wireless network 102 may assign a dedicated proximity detection resource $z_d$ to the wireless device WD1 (and to each of the other wireless devices sharing the resource $z_m$), and instruct the wireless device WD1 to begin monitoring transmissions on the dedicated proximity detection resource $z_d$ in preparation for a D2D inter-device session. The dedicated proximity detection resource $z_d$ and the instruction are received (at 814).

The terrestrial wireless network 102 may also assign another dedicated proximity detection resource $z_t$ to the wireless device WD1 to use for transmitting a beacon. The terrestrial wireless network 102 may instruct other wireless devices to begin monitoring transmissions on the dedicated proximity detection resource $z_t$ of the wireless device WD1 in preparation for a D2D inter-device session.

If the wireless device WD1 detects (at 816) a proximity detection signal in the dedicated proximity detection resource $z_d$, then the wireless device WD1 determines (at 818) that another wireless device sharing a common interest is in range. If the proximity detection signal in the dedicated proximity detection resource $z_d$ is not detected, then the wireless device determines (at 820) that another wireless device sharing a common interest is not in range.

On-Demand Proximity Detection Signal Transmission and Detection

In further implementations, the terrestrial wireless network 102 may assign a unique proximity detection signal to each wireless device during the Registration phase. One wireless device (WD1) may know a handle $h_2$ associated with one or more other wireless devices (including WD2) but may not know whether any of those Devices are currently within range of its transmissions. To determine the proximity of the one or more other wireless devices, the wireless WD1 may send a request to the terrestrial wireless network 102 to enable on-demand transmission of proximity detection signals from the wireless device(s) publicizing $h_2$.

An Interest Discovery phase that uses on-demand proximity detection signal transmissions may involve the following example process.

The interrogating wireless device (WD1) may send a Proximity Resolution Request on the uplink to the terrestrial wireless network 102. The Proximity Resolution Request contains the handle, $h_2$, being interrogated (or its associated handle reference $r_2$).

In some examples, the terrestrial wireless network 102 may maintain a cache of handles publicized by the wireless devices within the terrestrial wireless network's coverage area. If the terrestrial wireless network 102 finds the handle $h_2$ in its cache, then the terrestrial wireless network 102 may instruct the wireless devices publicising $h_2$ (including WD2) to begin transmitting their proximity detection signals. This instruction may be included in a broadcast message or in a dedicated AS message (e.g. an RRC message or a MAC control element).

If the terrestrial wireless network 102 does not maintain a handle cache, or if the terrestrial wireless network 102 does not find handle $h_2$ in its cache, then the terrestrial wireless network 102 may broadcast a Proximity Resolution Order in a region of the PDSCH referenced by a pre-configured RNTI (the Proximity Resolution RNTI, PR-RNTI) in a DCI of the PDCCH.

In some examples, the Proximity Resolution Order may include the timing and the duration of a subsequent proximity detection signal transmission.

Wireless devices that support on-demand proximity detection signal transmissions monitor the PDCCH for the PR-RNTI and may retrieve the (list of) handle(s) contained in the corresponding Proximity Resolution Order. If a wireless device (e.g. WD2) that is monitoring the PR-RNTI detects a handle that matches one of its publicized handle(s), the wireless device WD2 may begin to transmit its assigned proximity detection signal either in a predetermined manner or using the timing and duration information contained in the Proximity Resolution Order.

Once the terrestrial wireless network 102 has initiated transmission of the proximity detection signals, the terrestrial wireless network 102 may return a Proximity Resolution Response to the interrogating wireless device (WD1) that may include the identity, timing and the duration of the subsequent transmissions of proximity detection signals by wireless devices (including WD2) publicizing the requested handle ($h_2$).

In other examples, the wireless device WD1 may directly monitor the PDCCH for a DCI encoded with the PR-RNTI and decode the Proximity Resolution Order to determine the timing and the duration of the subsequent proximity detection signal transmissions.

Discovery of Proximity before Interest

To discover proximity before interest, a wireless device (e.g. WD1), operating in a promiscuous mode, searches for proximity detection signals being transmitted by any other proximate wireless device. Once a proximity detection signal transmitted by a proximate wireless device (e.g. WD2) has been discovered, ancillary communications are performed to determine whether the wireless devices WD1 and WD2 have a common interest.

In some implementations, proximity detection resources may be allocated from within a set of radio resources, which make up a proximity detection resource group (PDRG) that is known to the wireless devices. In some examples, one or more proximity detection resource groups may be configured by the terrestrial wireless network 102 within the set of D2D radio resources (e.g. the LTE PUSCH); in other examples, one or more proximity detection resource groups may be configured by the terrestrial wireless network 102 within a set of dedicated radio resources (e.g. an IDS PUCCH).

In one example, PDRG configurations may be broadcast to all wireless devices (e.g. in a System Information Block, SIB); in another example, PDRG configurations may be contained in an AS radio resource configuration message sent to a specific wireless device (e.g. an RRC message or a MAC control element). In other examples, proximity detection resource groups may be dynamically scheduled within the D2D radio resources by the terrestrial wireless network 102 using a pre-configured RNTI (referred to as a Proximity Detection Resource RNTI, PDR-RNTI) in a DCI of the PDCCH. In further examples, the PDRG information may be configured into a wireless device through standardization, operator implementation, or other mechanisms.

In some implementations, proximity detection via PDRG monitoring may involve the following process.

Once the wireless device WD1 has been allocated a proximity detection resource, the wireless device WD1 may announce its presence by transmitting its proximity detection signal over the designated radio resources within a PDRG.

In some examples, the proximity detection resource $z_m$ to be used by the wireless device WD1 is assigned to the wireless device by the terrestrial wireless network 102 via a dedicated AS radio resource configuration message.

Other wireless devices that are interested in detecting proximate wireless devices may use the PDRG information configured via a broadcast or dedicated AS message or signalled via the PDR-RNTI to monitor proximity detection signal transmissions in a proximity detection resource group.

If a wireless device (e.g. WD2) detects a proximity detection signal, in some examples, the wireless device WD2 may request assistance from the terrestrial wireless network 102 to determine if the wireless device WD2 and the discovered wireless device (WD1) have a common interest before establishing a D2D link.

In other examples, the wireless device WD2 may initiate a D2D inter-device session with the discovered wireless device (WD1) and determine whether they have a common interest after establishing a D2D link.

Monitoring of Common Proximity Beacons

In some implementations, proximity detection may be based on common proximity detection signals (beacons) that may be simultaneously transmitted by multiple wireless devices. As a result, the number of dedicated proximity detection resources may be reduced in such implementations.

In these implementations, the proximity detection signal does not contain information that is sufficient for directly identifying a wireless device that is transmitting the signal. As such, the proximity detection signal in these implementations may be used only to determine that at least one of the transmitting wireless devices is in close proximity to a receiver.

Proximity detection via a proximity detection beacon may involve the following.

The set of common proximity detection resources $\{z_i\}$ available to wireless devices may be signalled by the network either through a broadcast (e.g. in a SIB) or in a dedicated AS radio resource configuration message (e.g. an RRC message or a MAC control element).

The wireless device (WD1) that wishes to announce its presence acquires a common proximity detection resource and begins transmitting its proximity detection signal over the common proximity detection resource. Note that other wireless devices may also be contemporaneously announcing their presence using the common proximity detection resource.

In some examples, the proximity detection resource $z_m$ to be used by the wireless device WD1 is assigned to the wireless device by the terrestrial wireless network 102 via a dedicated AS radio resource configuration message.

In other examples, the proximity detection resource $z_m$ is randomly selected by the wireless device WD1 from the set of proximity detection resources $\{z_i\}$ made available by the terrestrial wireless network 102.

Other wireless devices that are interested in detecting proximate wireless devices may monitor the set of common proximity detection resources $\{z_i\}$ configured by the terrestrial wireless network 102.

If an interested wireless device (WD2) detects a signal on a common proximity detection resource $z_m$, the wireless device WD2 may send a Beacon Reception Indication to the terrestrial wireless network 102 along with the identity of the proximity detection resource in which the signal was detected. In some examples, a wireless device may be configured to listen to all beacon signals and to report all beacons that the wireless device detects. In other examples, a wireless device may be configured to listen to only a subset of the beacon signals and to report only those beacons if they are detected.

In some examples, a wireless device may be configured to report beacon signals as they are detected. In other examples, a wireless device may be configured to report detected beacons only at prescribed intervals.

If the detected proximity detection resource $z_m$ was randomly selected by a wireless device, the terrestrial wireless network 102 may broadcast a Handle Resolution Order to learn the identity of the transmitting wireless device(s) using that resource.

The terrestrial wireless network 102 may assign dedicated proximity detection resources to each of the wireless devices sharing the indicated beacon (including WD1) and instruct them to begin transmitting their dedicated proximity detection signals.

The terrestrial wireless network 102 may send a Beacon Reception Response to the wireless device WD2 that includes the proximity detection resources assigned to the beaconing wireless devices, allowing the wireless device WD2 to monitor transmissions from those wireless (including WD1) in preparation for a D2D inter-device session.

If the wireless device WD2 detects a dedicated proximity detection signal, the wireless device WD2 may request assistance from the network to determine if the wireless device WD2 and the discovered wireless (WD1) have a common interest before establishing a D2D link.

In other examples, the wireless device WD2 may initiate a D2D inter-device session with the discovered wireless device (WD1) and determine whether they have a common interest after establishing a D2D link.

Monitoring a Discovery Response Channel

Figure 9:
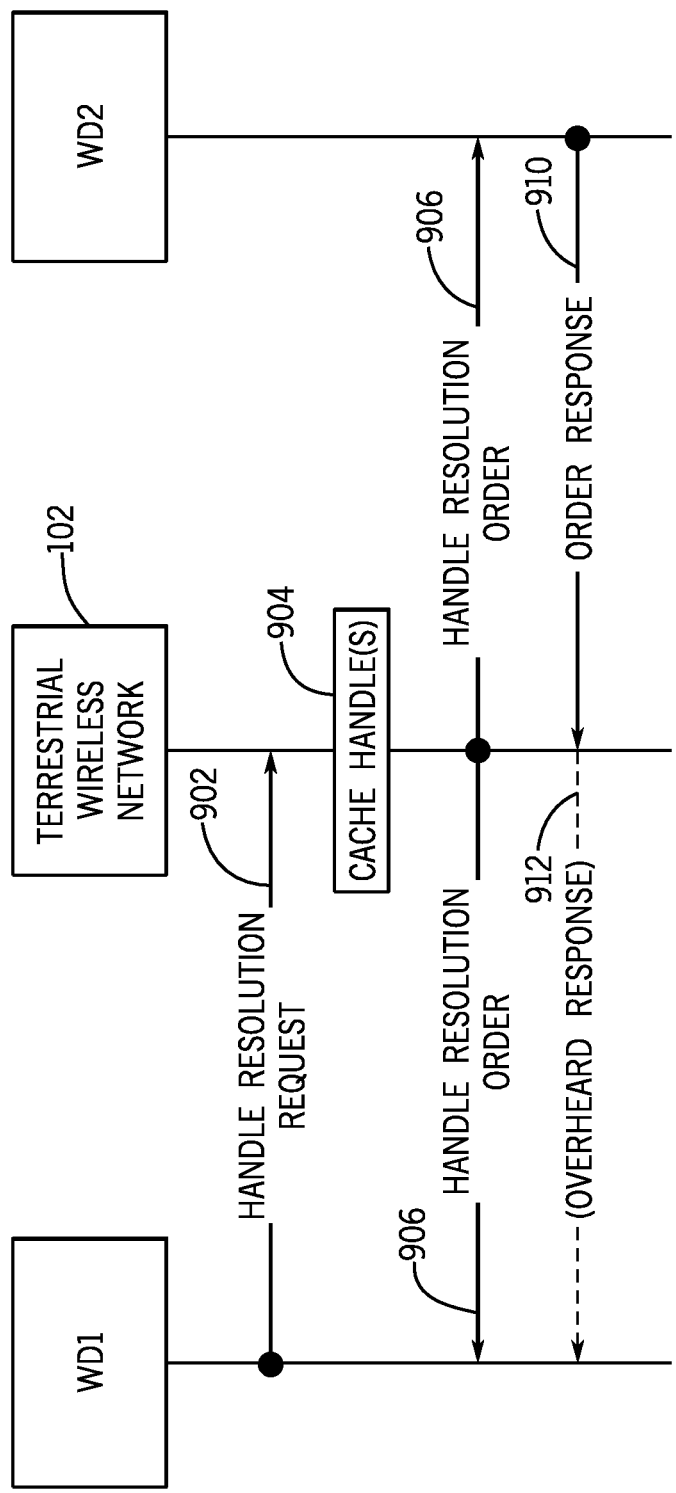
FIG. 9 is a message flow diagram of a process of monitoring a discovery response resource that provides implicit proximity detection, according to further implementations.

Some discovery procedures may include a response from a wireless device (e.g. WD2) that is a candidate for a D2D inter-device session. In these implementations, the response from the wireless device WD2 may be used as an implicit proximity detection signal—i.e. any other wireless device (WD1) that can detect the response may be deemed a proximate wireless device. For example, the example procedure described in FIG. 9 may be used.

A wireless device (e.g. WD1) may send (at 902) a request, such as a Handle Resolution Request, on the uplink to the terrestrial wireless network 102. The Handle Resolution Request may include the handle that is of interest to the wireless device WD1. The handle in the Handle Resolution Request may be cached (at 904) by the terrestrial wireless network 102.

The wireless device WD1 may monitor a downlink channel to detect a re-broadcast (at 906) of its query (e.g. in the form of a Handle Resolution Order) by the terrestrial wireless network 102 to other wireless devices in the coverage area. In some examples, the broadcast from the terrestrial wireless network 102 may be transmitted over a preconfigured broadcast channel; in other examples, the broadcast may be a transmission that is dynamically scheduled using a pre-configured RNTI (e.g. the Handle Resolution RNTI, HR-RNTI).

Once the wireless device WD1 has detected the re-broadcast (at 906) of its query, the wireless device WD1 may then attempt to detect (at 912) a response to its query sent (at 910) from a proximate wireless device to the terrestrial wireless network 102. This detection (at 912) is referred to as overhearing.

In some examples, the radio resources to be used for the uplink response (910) may be configured by the terrestrial wireless network 102 either through a broadcast (e.g. in a System Information Block, SIB) or in a dedicated AS radio resource configuration message (e.g. an RRC message or a MAC control element).

In other examples, the radio resources to be used for the uplink response (910) may be derived from the downlink radio resources used to broadcast the request. In further examples, the radio resources to be used for the uplink response may be explicitly scheduled by the terrestrial wireless network 102 (e.g. in a DCI of the PDCCH).

Interest Discovery with Network Assistance

Figure 10:
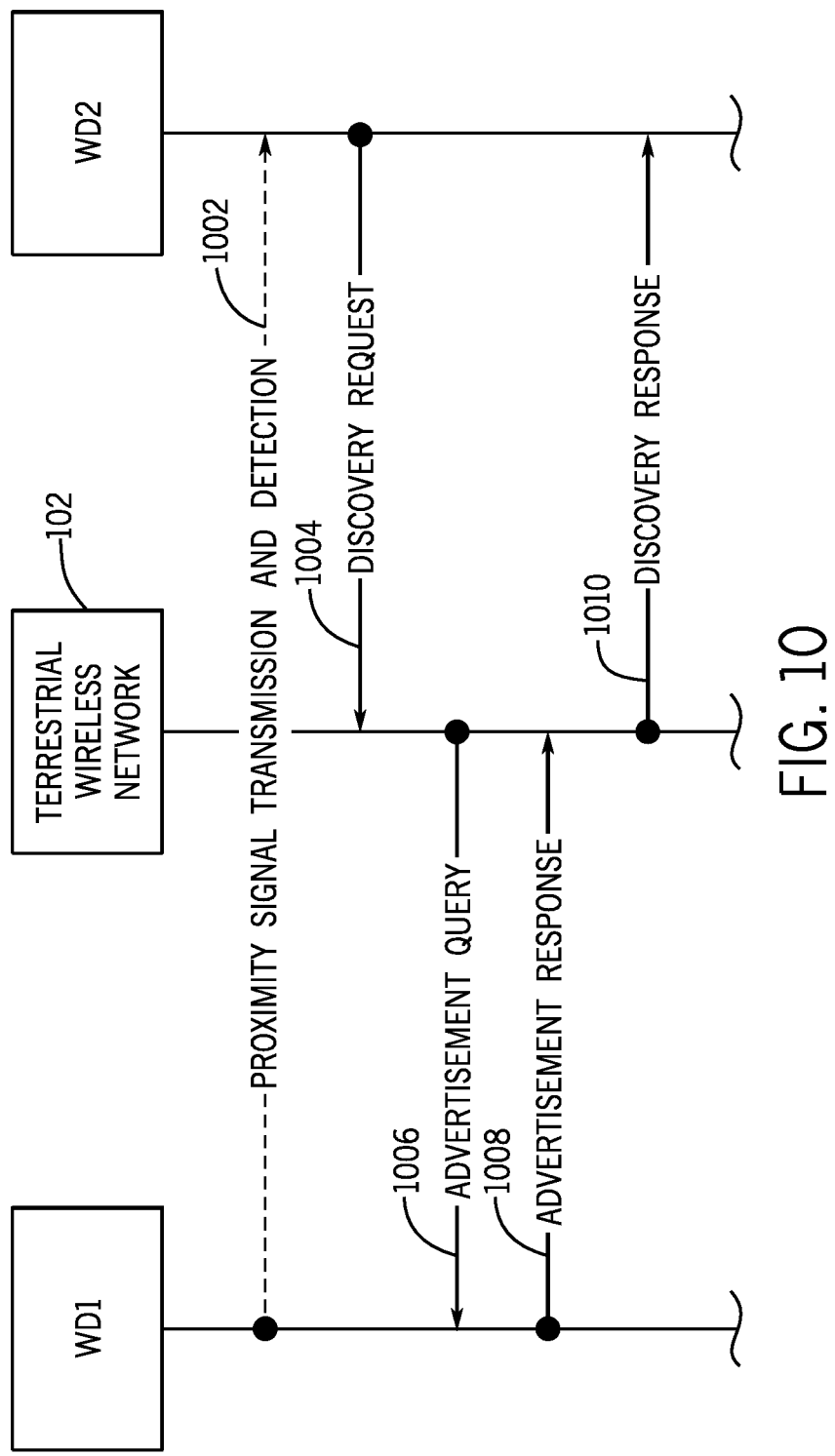
FIG. 10 is a message flow diagram of a process of performing interest discovery with network assistance.

As depicted in FIG. 10, after a wireless device (e.g. WD2) detects (at 1002) a proximity detection signal transmitted by a proximate wireless device (e.g. WD1), the wireless device WD2 may request assistance from the terrestrial wireless network 102 to determine whether the two wireless devices have a common interest before attempting to establish a D2D link.

The wireless device WD2 may send (at 1004) a discovery request to the terrestrial wireless network 102 that includes the identity of the detected proximity detection signal. In some examples, this may involve a two-step process in which AS signalling is used to determine the wireless device behind the detected signal and NAS signalling is used to initiate discovery of interests.

The wireless device WD2 may use AS signalling to send a proximity detection signal resolution request to the terrestrial wireless network 102; this request includes the identity of the detected proximity detection signal. The response from the terrestrial wireless network 102 includes the identity of the wireless device (WD1) to whom the detected signal is currently assigned.

The wireless device WD2 may then use NAS signalling to send (at 1004) the discovery request to the terrestrial wireless network 102 that includes the identity of the discovered wireless device (WD1).

In some examples, a wireless device may use NAS signalling, during the Registration phase, to provide the terrestrial wireless network 102 with information on the handle(s) being publicized by the wireless device. If the terrestrial wireless network 102 determines that information relating to publicized handle(s) of the wireless device WD1 is available at the terrestrial wireless network 102, then the terrestrial wireless network 102 can proceed to task 1010 to respond to the wireless device WD2.

However, if the information relating to the publicized handle(s) of the wireless device is not available at the terrestrial wireless network 102, the terrestrial wireless network 102 may use NAS signalling to send (at 1006) an advertisement query to the wireless device WD1, to retrieve the information regarding handle(s) publicized by the wireless device WD1. The handle(s) publicized by the wireless device WD1 are then provided (at 1008) to the terrestrial wireless network 102 in an advertisement response.

In further examples, additional information regarding the wireless device WD2 (such as its identifier or capabilities) may be included in the message to the wireless device WD1. The additional information may allow the wireless device WD1 to decide, for example, whether to advertise its presence to the wireless device WD2 or to hide its proximity from the wireless device WD2.

Information on the handle(s) publicized by the wireless device (WD1) associated with the detected proximity detection signal are provided (at 1010) by the terrestrial wireless network 102 to the wireless device WD2 in a discovery response.

If the wireless device WD2 determines, based on the discovery response from the terrestrial wireless network 102, that the wireless device WD2 shares a common interest with the wireless device WD1 may then send a request to the terrestrial wireless network 102 for the establishment of a D2D inter-device session.

In alternate implementations that may reduce the amount of signalling at the expense of more processing in the terrestrial wireless network 102, assistance from the terrestrial wireless network may involve the following.

The wireless device WD2 may send a conditional IDS establishment request to the terrestrial wireless network 102 that includes the identity of the detected proximity detection signal and the conditions under which the inter-device session should be established. These conditions may include the handle(s) that is (are) of interest to the wireless device WD2.

In some examples, a wireless device may use NAS signalling, during the Registration phase, to provide the terrestrial wireless network 102 with information on the handle(s) being publicized by the wireless device. If the information regarding handle(s) publicized by the wireless device WD1 is available at the terrestrial wireless network 102, then the wireless device 102 can proceed to send a discovery response to the wireless device WD2 (similar to 1010 in FIG. 10).

If the information regarding handle(s) publicized by the wireless device WD1 is not available at the terrestrial wireless network 102, the terrestrial wireless network 102 may use NAS signalling to send an advertisement query (similar to 1006 in FIG. 10) to the wireless device WD1, to retrieve the information. The handle(s) publicized by the wireless device WD1 is (are) then provided to the terrestrial wireless network in an advertisement response (similar to 1008 in FIG. 10).

Unlike in FIG. 10 where the terrestrial wireless network 102 sends the handle(s) of the wireless device WD1 to the wireless device WD2, the terrestrial wireless network 102 according to the alternative implementations may then attempt to match the handle(s) publicized by WD1 with the handle(s) of interest to WD2. If the terrestrial wireless network 102 determines that the wireless devices have at least one handle of interest in common, the terrestrial wireless network 102 may then initiate the establishment of a D2D inter-device session. Otherwise, the terrestrial wireless network 102 provides a negative response to the IDS establishment request from the wireless device WD2 and the inter-device session establishment process is terminated.

Interest Discovery Via D2D Link

In other implementations, rather than performing the interest discovery with network assistance, as discussed above, interest discovery can be performed over a D2D link. After a wireless device (e.g. WD2) detects a proximity detection signal transmitted by a proximate wireless device (e.g. WD1), the wireless device WD2 may establish a D2D link with the discovered wireless device WD1 to determine if the wireless devices have a common interest that would warrant continuation of the D2D inter-device session.

Interest discovery via a D2D link may involve the following example process.

The wireless device WD2 may send an IDS establishment request to the terrestrial wireless network 102 that includes the identity of the detected proximity detection signal. Once the D2D link has been established, the wireless devices WD1 and WD2 exchange information over the D2D link to determine whether they have common interest. This exchange may involve the use of standard, open protocols and associated information elements or it may involve the use of proprietary, application-specific protocols.

If the wireless devices WD1 and WD2 determine that they do not have a reason to continue the session, one (or both) of the wireless devices may instruct the terrestrial wireless network 102 to terminate the D2D inter-device session.

System Architecture

Figure 11:
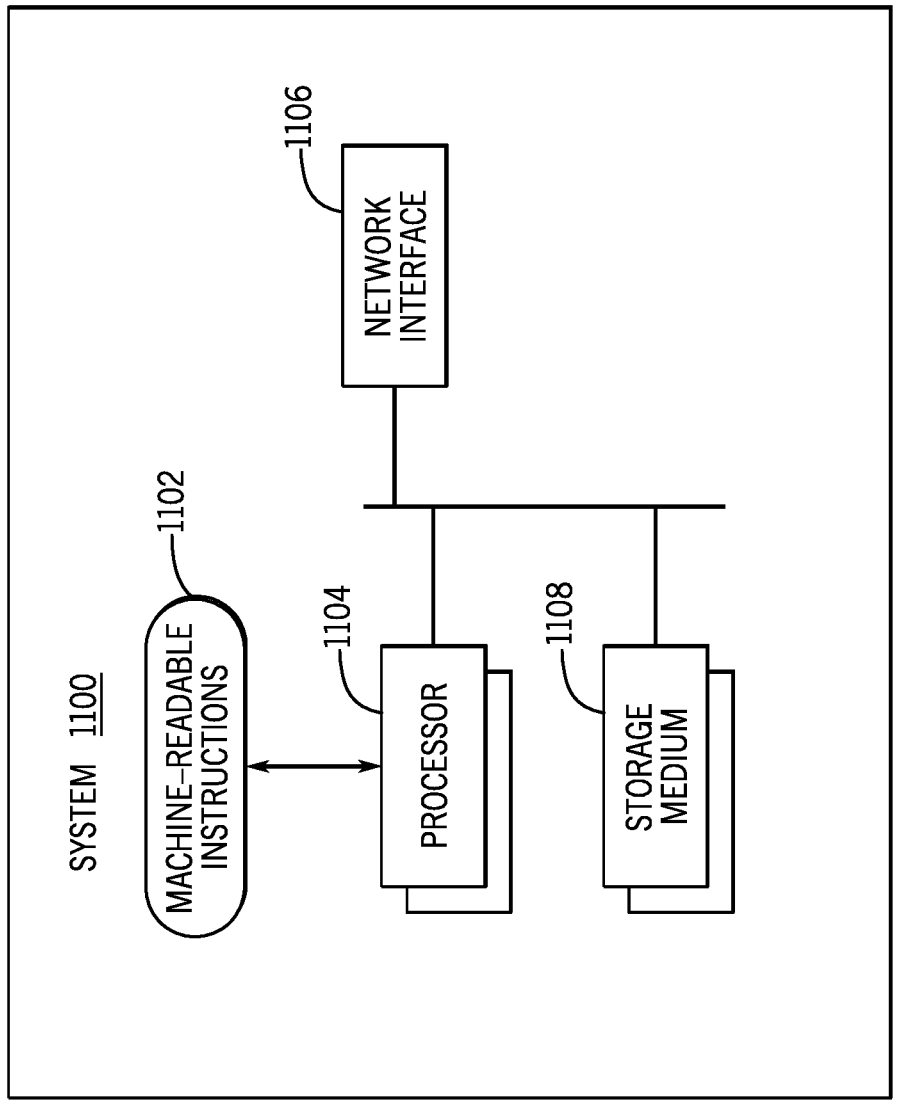
FIG. 11 is a block diagram of an example system according to some implementations.

FIG. 11 depicts an example system 1100, which can be a wireless device or a node of the terrestrial wireless network 102, such as the wireless access network node 110 or another terrestrial wireless network node.

The system 1100 includes machine-readable instructions 1102 that are executable on one or multiple processors 1104, to perform any of the various processes discussed above. A processor can include a microprocessor, microcontroller, processor module or subsystem, programmable integrated circuit, programmable gate array, or another control or computing device.

The system 1100 further includes a network interface 1106 and a storage medium (or storage media) 1108 coupled to the processor(s) 1104.

The storage medium (or storage media) 1108 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    determining whether a first wireless device in a wireless network is in a specified proximity to a second wireless device by detecting a proximity detection signal wirelessly transmitted by the second wireless device, wherein the proximity detection signal includes an identifier that is a compact form of a handle, the handle comprising information about an application of the second wireless device;
    sending, by the first wireless device to the wireless network, the identifier of the proximity detection signal detected by the first wireless device;
    in response to the sending of the identifier of the proximity detection signal to the wireless network, receiving, by the first wireless device, the handle associated with the identifier of the proximity detection signal transmitted by the second wireless device, wherein the receiving is directly from the wireless network, and the received handle comprises the information about the application of the second wireless device;
    sending, by the first wireless device to the wireless network, a request to establish an inter-device session with the second wireless device;
    receiving, by the first wireless device, an allocation of radio resources from the wireless network; and
    triggering, by the first wireless device, initiation of establishment of a device-to-device (D2D) wireless link between the first wireless device and the second wireless device, wherein the establishment of the D2D wireless link uses the radio resources.

2. The method of claim 1, further comprising:
    communicating, by the first wireless device, data in the D2D wireless link with the second wireless device.

3. The method of claim 1, further comprising:
    receiving, by the first wireless device, information identifying the proximity detection signal wirelessly transmitted by the second wireless device; and
    in response to the identifying information, monitoring for the proximity detection signal.

4. The method of claim 1, further comprising:
    receiving information relating to items advertised by the second wireless device, the information relating to items advertised by the second wireless device sent by the wireless network.

5. The method of claim 1, further comprising determining whether the first wireless device shares a common interest with the second wireless device based on the information about the application of the second wireless device.

6. The method of claim 1, wherein receiving the handle comprises receiving the handle in a broadcast channel configured in a radio resource between the first wireless device and the second wireless device.

7. The method of claim 1, wherein the proximity detection signal wirelessly transmitted by the second wireless device is in a proximity detection resource allocated to a proximity detection resource group from among plural proximity detection resource groups.

8. The method of claim 1, wherein the proximity detection signal wirelessly transmitted by the second wireless device is a proximity detection beacon that is simultaneously transmitted by plural wireless devices.

9. The method of claim 1, further comprising:
    in response to determining the specified proximity, sending, by the first wireless device, a request to the wireless network; and
    receiving, by the first wireless device, a response from the wireless network, the response being responsive to the request and including information used in determining sharing of a common interest between the first and second wireless devices.

10. The method of claim 1, further comprising terminating the D2D wireless link in response to determining no sharing of common interest between the first and second wireless devices.

11. The method of claim 1, wherein the establishment of the D2D wireless link uses the radio resources that are also useable by the first wireless device to establish a wireless link with a wireless network node of the wireless network that is connected to a core network node.

12. The method of claim 11, wherein the radio resources of the allocation comprise radio resources of a Long Term Evolution (LTE) network, and wherein the wireless network node comprises an enhanced node B.

13. The method of claim 1, wherein the handle identifies an item publicized by the second wireless device.

14. The method of claim 1, further comprising:
    providing, by the second wireless device to the wireless network, the handle; and
    receiving, by the second wireless device, the identifier of the proximity detection signal from the wireless network.

15. A network system comprising:
    a communication interface to communicate wirelessly with wireless devices; and
    at least one processor to:
        receive, from a first wireless device, an identifier of a proximity detection signal detected by the first wireless device, the identifier of the proximity detection signal sent by the first wireless device responsive to a determination by the first wireless device that the first wireless device is in a specified proximity to a second wireless device based on the proximity detection signal wirelessly transmitted by the second wireless device, wherein the proximity detection signal includes an identifier that is a compact form of a handle, the handle comprising information about an application running in the second wireless device;

in response to the receiving of the identifier of the proximity detection signal, send, to the first wireless device, the handle associated with the proximity detection signal transmitted by the second wireless device, the sent handle comprising the information about the application running in the second wireless device;

receive, from the first wireless device, a request to establish an inter-device session with the second wireless device; and send, to the first wireless device, an allocation of radio resources to allow initiation of establishment of a device-to-device (D2D) wireless link between the first wireless device and the second wireless device, wherein the establishment of the D2D wireless link uses the radio resources.

16. The network system of claim 15, wherein the handle identifies an item publicized by the second wireless device.

17. The network system of claim 15, wherein the request to establish the inter-device session includes a channel quality indication, and wherein the at least one processor is to determine, based on the channel quality indication, that the first and second wireless devices are sufficiently close for the inter-device session, and wherein the sending of the allocation of the radio resources is in response to determining, based on the channel quality indication, that the first and second wireless devices are sufficiently close for the inter-device session.

18. A first wireless device comprising:
at least one communication interface to communicate with a wireless network and a second wireless device; and
at least one processor to:
determine whether the first wireless device is in a specified proximity to the second wireless device by detecting a proximity detection signal wirelessly transmitted by the second wireless device, wherein the proximity detection signal includes an identifier that is a compact form of a handle, the handle comprising information about an application of the second wireless device;

send, to the wireless network, the identifier of the proximity detection signal detected by the first wireless device;

in response to the sending of the identifier of the proximity detection signal to the wireless network, receive the handle associated with the proximity detection signal transmitted by the second wireless device, wherein the receiving is directly from the wireless network, and the received handle comprises the information about the application of the second wireless device;

send, to the wireless network, a request to establish an inter-device session with the second wireless device;

receive an allocation of radio resources from the wireless network; and trigger establishment of a device-to-device (D2D) wireless link between the first wireless device and the second wireless device, wherein the establishment of the D2D wireless link uses the radio resources of the allocation.

19. The first wireless device of claim 18, wherein the establishment of the D2D wireless link uses the radio resources that are also useable by the first wireless device to establish a wireless link with a wireless network node of the wireless network that is connected to a core network node.

20. The first wireless device of claim 18, wherein the received handle is in a broadcast channel configured in a radio resource between the first wireless device and the second wireless device.

21. The first wireless device of claim 18, wherein the allocation of radio resources is responsive to a channel quality indication in the request to establish the inter-device session sent by the first wireless device to the wireless network, and the received allocation of radio resources from the wireless network is based on the wireless network determining based on the channel quality indication that the first and second wireless devices are sufficiently close for the inter-device session.

22. The first wireless device of claim 18, wherein the handle is provided by the second wireless device that received the identifier of the proximity detection signal from the wireless network.

* * * * *